(12) United States Patent
Yang et al.

(10) Patent No.: US 11,875,460 B2
(45) Date of Patent: *Jan. 16, 2024

(54) METHOD, APPARATUS AND STORAGE MEDIUM FOR DISPLAYING THREE-DIMENSIONAL SPACE VIEW

(71) Applicant: Ke.com (Beijing) Technology Co., Ltd., Beijing (CN)

(72) Inventors: Bin Yang, Beijing (CN); Yilang Hu, Beijing (CN); Hang Cao, Beijing (CN); Ruina Zhang, Beijing (CN); Mengdi Qi, Beijing (CN); Jiang Bian, Beijing (CN); Yuke Yang, Beijing (CN)

(73) Assignee: KE.COM (BEIJING) TECHNOLOGY CO., LTD., Beijing (CN)

( * ) Notice: Subject to any disclaimer, the term of this patent is extended or adjusted under 35 U.S.C. 154(b) by 86 days.

This patent is subject to a terminal disclaimer.

(21) Appl. No.: 17/356,472

(22) Filed: Jun. 23, 2021

(65) Prior Publication Data

US 2021/0327158 A1 Oct. 21, 2021

Related U.S. Application Data

(63) Continuation of application No. 17/072,021, filed on Oct. 15, 2020, now Pat. No. 11,158,134, which is a
(Continued)

(30) Foreign Application Priority Data

May 28, 2019 (CN) .......................... 201910451604.0
Jul. 15, 2019 (CN) .......................... 201910637657.1

(51) Int. Cl.
*G06T 17/10* (2006.01)
*G06T 19/20* (2011.01)
(Continued)

(52) U.S. Cl.
CPC .............. *G06T 19/00* (2013.01); *G06T 17/10* (2013.01); *G06T 19/20* (2013.01); *G06V 10/764* (2022.01);
(Continued)

(58) Field of Classification Search
CPC ......... G06T 17/10; G06T 19/00; G06T 19/20; G06T 2200/08; G06T 2210/04;
(Continued)

(56) References Cited

U.S. PATENT DOCUMENTS 6,005,570 A    12/1999  Gayraud et al.
9,600,931 B2 *  3/2017  Tange .................. G09B 29/007
(Continued)

FOREIGN PATENT DOCUMENTS

CN      103400415 A    11/2013
CN      103700127 A     4/2014
(Continued)

*Primary Examiner* — Sing-Wai Wu
(74) *Attorney, Agent, or Firm* — Mauriel Kapouytian Woods LLP; Ran Pang; Michael Mauriel

(57) ABSTRACT

The present disclosure provides a method for displaying a three-dimensional space view. The three-dimensional space view includes a first three-dimensional space view and a second three-dimensional space view. The method includes presenting the first three-dimensional space view on a first user interface; presenting the second three-dimensional space view on a second user interface; changing the first three-dimensional space view according to a user input; and changing the second three-dimensional space view according to a change in the first three-dimensional space view.

19 Claims, 9 Drawing Sheets

Related U.S. Application Data continuation of application No. PCT/CN2019/115535, filed on Nov. 5, 2019.

(51) Int. Cl.
  *G06T 19/00* (2011.01)
  *G06V 10/764* (2022.01)
  *G06V 10/82* (2022.01)
  *G06V 20/10* (2022.01)

(52) U.S. Cl.
  CPC .............. *G06V 10/82* (2022.01); *G06V 20/10* (2022.01); *G06T 2200/08* (2013.01)

(58) Field of Classification Search
  CPC ... G06T 2219/024; G06T 9/00; G06V 10/462; G06V 10/764; G06V 10/82; G06V 20/10
  See application file for complete search history.

(56) References Cited

U.S. PATENT DOCUMENTS

| | | | |
|---|---|---|---|
| 9,676,521 | B2 | 6/2017 | McGee |
| 2007/0127791 | A1 | 6/2007 | Ernvik et al. |
| 2013/0222393 | A1 | 8/2013 | Merrell et al. |
| 2013/0259308 | A1 | 10/2013 | Klusza et al. |
| 2014/0340396 | A1 | 11/2014 | Jeon et al. |
| 2016/0285416 | A1* | 9/2016 | Tiwari .................. G06Q 10/06 |
| 2018/0315162 | A1* | 11/2018 | Sturm .................. H04N 13/271 |
| 2019/0164340 | A1* | 5/2019 | Pejic ....................... G06T 17/05 |

FOREIGN PATENT DOCUMENTS

| | | |
|---|---|---|
| CN | 104461309 A | 3/2015 |
| CN | 106157352 A | 11/2016 |
| CN | 106293972 A | 1/2017 |
| CN | 106569595 A | 4/2017 |
| CN | 106600709 A | 4/2017 |
| CN | 106683177 A | 5/2017 |
| CN | 106777666 A | 5/2017 |
| CN | 107515991 A | 12/2017 |
| CN | 107526895 A | 12/2017 |
| CN | 107590337 A | 1/2018 |
| CN | 107742319 A | 2/2018 |
| CN | 108062797 A | 5/2018 |
| CN | 108459715 A | 8/2018 |
| CN | 108595773 A | 9/2018 |
| CN | 108694266 A | 10/2018 |
| CN | 108961387 A | 12/2018 |
| CN | 108961426 A | 12/2018 |
| CN | 109448120 A | 3/2019 |
| CN | 109559379 A | 4/2019 |
| CN | 109583038 A | 4/2019 |
| CN | 109740243 A | 5/2019 |
| CN | 110363853 A | 10/2019 |
| EP | 2996089 A1 | 3/2016 |
| JP | 2002042170 A | 2/2002 |
| JP | 2014205484 A | 10/2014 |
| JP | 2015003718 A | 1/2015 |
| JP | 2016058065 A | 4/2016 |
| JP | 5999802 B1 | 9/2016 |
| JP | 6116746 B1 | 4/2017 |

\* cited by examiner

Acquiring, by a user terminal, field-of-view change information of a user during roaming and/or glancing in a current three-dimensional virtual space, wherein the field-of-view change information comprises point position change information and/or line-of-sight direction change information ⟿ 501

Adjusting a display field of view of a second three-dimensional model of an apartment according to the field-of-view change information if the current three-dimensional virtual space corresponds to a first three-dimensional model of the apartment, such that the first three-dimensional model of the apartment and the second three-dimensional model of the apartment are displayed on the same screen at the same field of view ⟿ 502

Adjusting a display field of view of the first three-dimensional model of the apartment according to the field-of-view change information if the current three-dimensional virtual space corresponds to the second three-dimensional model of the apartment, such that the first three-dimensional model of the apartment and the second three-dimensional model of the apartment are displayed on the same screen at the same field of view, wherein the first model of the apartment and the second model of the apartment have been displayed on the same screen at the same field of view before the field of view of the user changes, the first three-dimensional model of the apartment is a three-dimensional model of a current apartment, and the second three-dimensional model of the apartment is a three-dimensional model of a decorated apartment obtained after a recommended decoration effect is loaded ⟿ 503

FIG.5

METHOD, APPARATUS AND STORAGE MEDIUM FOR DISPLAYING THREE-DIMENSIONAL SPACE VIEW

CROSS REFERENCE TO RELATED APPLICATIONS

The present application is a continuation of U.S. patent application Ser. No. 17/072,021, filed on Oct. 15, 2020, which is a continuation of the international application No. PCT/CN2019/115535, filed on Nov. 5, 2019 and entitled "Method, apparatus and storage medium for displaying three-dimensional space view", and the international application claims the right of priority of the Chinese patent applications of application number 201910451604.0, filed with the National Intellectual Property Administration, PRC on May 28, 2019 and entitled "Method, apparatus and system for displaying three-dimensional models of apartment before and after decoration on the same screen", and application number 201910637657.1, filed with the National Intellectual Property Administration, PRC on Jul. 15, 2019 and entitled "Method, apparatus, device and storage medium for generating furniture placement plan", the entire contents of these applications being incorporated herein by reference.

FIELD

The present disclosure relates to computers, and in particular to a method, an apparatus and a storage medium for displaying a three-dimensional space view.

BACKGROUND

With the further development of the real estate industry, the home decoration industry has also been greatly developed, and the demand for home decoration is also increasing. In a traditional decoration process, professional and experienced designers are required to propose retrofit designs, ordinary residents are often not competent, and the effect of furniture layout is heavily dependent on the professional designers. If a user wants to see an effect of apartment decoration based on his/her own apartment layout, it is necessary to go through processes such as measuring the apartment by a professional designer, communicating style preferences with the user, and designing, which usually takes a lot of time to design drawings and occupies a large number of designer resources. The design procedure is long, cumbersome and expensive, which thus lacks universal applicability.

Different from the currently popular concept of apartment-viewing through images or videos or by means of panoramic apartment-viewing, which cannot provide depth information and real perception, "VR apartment-viewing" indicates that a three-dimensional scenario of an apartment is truly restored with VR technologies, which provides the user with an immersive apartment-viewing experience in a free mode, so that the user can experience the real apartment-viewing scenario without leaving the apartment. For example, by opening VR apartments on an APP and touching any position on the screen, depth information including the size, orientation, and distance of the real space of the apartment can be obtained. In terms of restoring the three-dimensional scenario of the apartment, scanning and video shooting can be first performed on the apartment at a plurality of points and angles to obtain complete three-dimensional point cloud data, latitude and longitude data, and multi-exposure high-definition color photos. Later, all data and image textures are mapped to a three-dimensional model through three-dimensional reconstruction technologies such as automatic modeling, intelligent hole filling, fully automatic data extraction, and HDR optimization, to obtain a final real apartment space seen by the user.

The VR apartments seen by the user include new apartments and second-hand apartments. Many of the new apartments are roughcast apartments, and some of the second-hand apartments have been decorated for many years and the facilities thereof are outdated. A user usually needs to do decorating for accommodation after purchasing the apartment. The user cannot know the appearance of the apartment after decoration by purely viewing the apartment based on the actual VR apartment. Therefore, the incomplete information for viewing the apartment is not conducive to making an apartment purchase decision by the user.

SUMMARY

The present disclosure provides a method, an apparatus and a storage medium for displaying a three-dimensional space view (or a three-dimensional model).

In one aspect, the present disclosure provides a method for displaying a three-dimensional space view, the three-dimensional space view including a first three-dimensional space view and a second three-dimensional space view, and the method including: presenting the first three-dimensional space view on a first user interface; presenting the second three-dimensional space view on a second user interface; changing the first three-dimensional space view according to a user input; and changing the second three-dimensional space view according to a change in the first three-dimensional space view.

In another aspect, the present disclosure provides a method for displaying a three-dimensional space view, the three-dimensional space view at least including a first three-dimensional space view and a second three-dimensional space view, and the method including: presenting the first three-dimensional space view on a first user interface; presenting the second three-dimensional space view on a second user interface; receiving a user input at the first user interface, to generate a view change instruction of the first three-dimensional space view according to the user input; loading, by the first user interface according to the view change instruction, data used for updating the first three-dimensional space view; sending the view change instruction from the first user interface to the second user interface; loading, by the second user interface according to the view change instruction, data used for updating the second three-dimensional space view; and updating, by the first user interface and the second user interface, the first three-dimensional space view and the second three-dimensional space view respectively according to the loaded data used for updating the first three-dimensional space view and the loaded data used for updating the second three-dimensional space view.

In another aspect, the present disclosure provides a method for displaying three-dimensional models of an apartment before and after decoration on the same screen, the method including: acquiring, by a user terminal, field-of-view change information of a user during roaming and/or glancing in a current three-dimensional virtual space, where the field-of-view change information includes point position change information and/or line-of-sight direction change information; adjusting a display field of view of a second three-dimensional model of the apartment according to the field-of-view change information if the current three-dimensional virtual space corresponds to a first three-dimensional model of the apartment, such that the first three-dimensional model of the apartment and the second three-dimensional model of the apartment are displayed on the same screen at the same field of view; and adjusting a display field of view of the first three-dimensional model of the apartment according to the field-of-view change information if the current three-dimensional virtual space corresponds to the second three-dimensional model of the apartment, such that the first three-dimensional model of the apartment and the second three-dimensional model of the apartment are displayed on the same screen at the same field of view, where the first apartment model and the second apartment model have been displayed on the same screen at the same field of view before the field of view of the user changes, and the first three-dimensional model of the apartment is a three-dimensional model of a current apartment, and the second three-dimensional model of the apartment is a three-dimensional model of a decorated apartment obtained after a recommended decoration effect is loaded.

In another aspect, the present disclosure provides a method for generating a furniture placement plan based on an apartment layout, including: acquiring sample apartment layout structure data corresponding to a first sample apartment layout image; acquiring a second sample apartment layout image in which furniture has been placed and which corresponds to the first sample apartment layout image, and annotating the furniture placed in the second sample apartment layout image to generate first furniture information; processing a to-be-decorated apartment layout image with a preset furniture placement decision rule according to the first sample apartment layout image, the second sample apartment layout image, the first furniture information, and the sample apartment layout structure data, to acquire a furniture placement plan corresponding to the to-be-decorated apartment layout image.

In another aspect, the present disclosure provides a computing apparatus which includes a memory and a processor, where the memory stores program instructions that, when executed by the processor, enable the processor to implement the method according to any of the aspects of the present disclosure.

In another aspect, the present disclosure provides a non-transitory computer readable storage medium which stores program instructions that, when executed by a processor, enable the processor to implement the method according to any of the aspects of the present disclosure.

BRIEF DESCRIPTION OF THE DRAWINGS

To describe technical solutions in embodiments of the present disclosure or in the prior art more clearly, accompanying drawings to be used for description of the embodiments or the prior art will be briefly introduced below. Apparently, the accompanying drawings in the following description show some embodiments of the present disclosure, and those of ordinary skill in the art may derive other drawings from these accompanying drawings without any creative effort.

FIG. 5 is a flowchart of a method for displaying three-dimensional models of an apartment before and after decoration on the same screen provided in an embodiment of the present disclosure;

DETAILED DESCRIPTION

Figure 1:
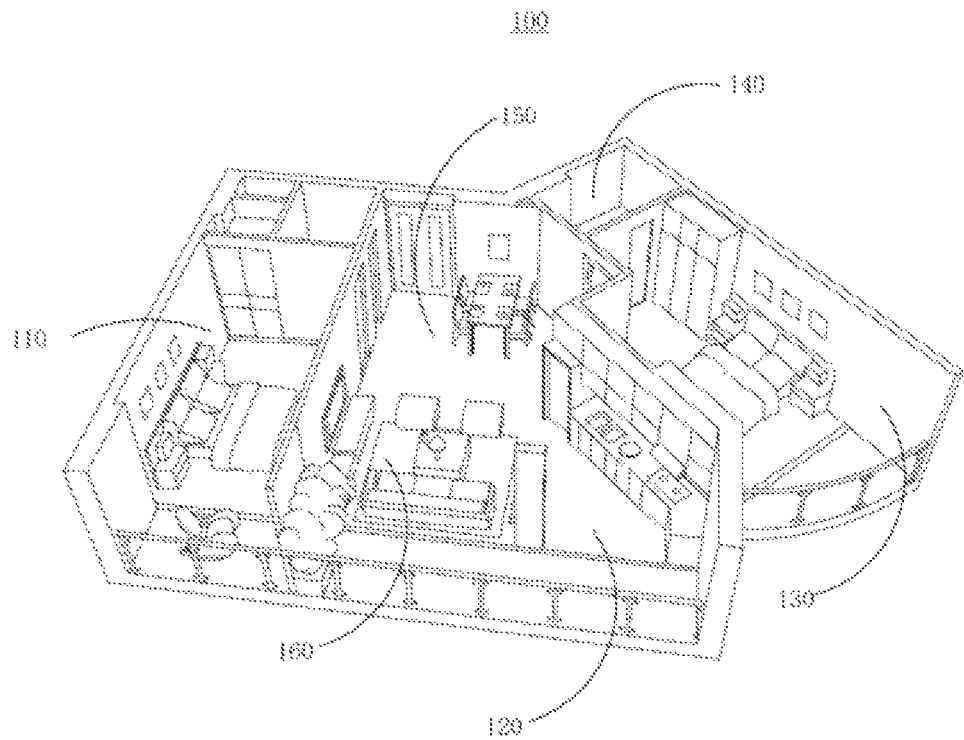
FIG. 1 is a schematic diagram illustrating an exemplary three-dimensional virtual reality (VR) environment according to an embodiment of the present disclosure.

In order to make the objectives, technical solutions and advantages of embodiments of the present disclosure clearer, the technical solutions in the embodiments of the present disclosure will be clearly and completely described below with reference to the accompanying drawings in the embodiments of the present disclosure. Apparently, the described embodiments are a part, but not all of the embodiments of the present disclosure. All other embodiments obtained by those of ordinary skill in the art based on the embodiments of the present disclosure without any creative effort shall fall within the protection scope of the present invention.

Those skilled in the art may understand that the terms "first" and "second" in the embodiments of the present disclosure are only used to distinguish between different steps, devices, or modules, etc., and represent neither any specific technical meaning nor a definite logic sequence therebetween.

It should be further understood that in the embodiments of the present disclosure, "a plurality of" may refer to two or more than two, and "at least one" may refer to one, two or more than two.

It should be further understood that any component, data, or structure mentioned in the embodiments of the present disclosure may be generally understood as one or more if it is not explicitly defined or given the opposite enlightenment in the context.

In addition, the term "and/or" in the present disclosure simply represents an association relationship that describes associated objects, and represents that three relationships may exist, for example, A and/or B may represent the following three cases: only A exists, both A and B exist, and only B exists. In addition, the character "/" in the present disclosure generally indicates an "or" relationship between the associated objects.

It should be further understood that the description of the embodiments in the present disclosure emphasizes the differences between the embodiments, and for the same or similar parts, reference can be made to each other. For brevity, details are not repeatedly described herein.

In addition, it should be understood that, for ease of description, the dimensions of the various parts shown in the accompanying drawings are not drawn according to the actual proportional relationship.

The following description of at least one exemplary embodiment is actually merely illustrative, and in no way serves as any limitation to the present disclosure and its application or use.

Technologies, methods and devices known to those of ordinary skill in the related art may not be discussed in detail, but should be considered as part of the specification where appropriate.

It should be noted that similar reference signs and letters refer to similar items in the following drawings. Therefore, once a specific item is defined in one of the drawings, it need not be further discussed in subsequent drawings.

The embodiments of the present disclosure can be applied to electronic devices such as terminal devices, computer systems, and servers, which can operate with numerous other general-purpose or dedicated computing system environments or configurations. Examples of well-known terminal devices, computing systems, environments, and/or configurations suitable for use with electronic devices such as terminal devices, computer systems, or servers include but are not limited to: a personal computer system, a server computer system, a thin client, a thick client, a handheld or laptop device, a microprocessor-based system, a set top box, a programmable consumer electronics, a networked personal computer, a small computer system, a large computer system, and a distributed cloud computing technology environment including any of the above systems, etc.

The electronic devices such as terminal devices, computer systems, and servers may be described in the general context of computer system executable instructions (such as a program module) executed by the computer system. Generally, program modules may include a routine, a program, a target program, a component, logic, a data structure, etc., which perform specific tasks or implement specific abstract data types. The computer system/server may be implemented in a distributed cloud computing environment. In the distributed cloud computing environment, a task may be performed by a remote processing device linked through a communication network. In the distributed cloud computing environment, the program module may be located on a local or remote computing system storage medium including a storage device.

FIG. 1 illustrates an exemplary three-dimensional virtual reality (VR) environment 100 according to an embodiment of the present disclosure. As shown in FIG. 1, the 3D VR environment 100 may simulate or represent a residential unit, such as an apartment or a residential story building. It is noted that the 3D VR environment 100 may include a VR representation of any in-door space or environment. Referring to FIG. 1, the 3D VR environment 100 may include one or more functional spaces, such as 110, 120, 130, 140, 150, and 160. As used herein, a functional space refers to an enclosed or partially enclosed space that is associated with a particular function. In some cases, a functional space may correspond to a room. For example, the functional space 110 may correspond to a first bedroom, and the functional space 130 may correspond to a second bedroom. In some cases, a functional space may correspond to an enclosed or partially enclosed space within or adjacent to a room. For example, the functional space 140 may correspond to a closet. In some cases, a function space may correspond to a region that is generally used for a specific purpose. For example, the functional space 120 may correspond to a kitchen region, the functional space 150 may correspond to a dining region, and the functional space 160 may correspond to a living room. Although functional spaces 120, 150, and 160 may share the same room (e.g., an enclosed region), they may be considered as different functional spaces due to their different functions.

Figure 2:
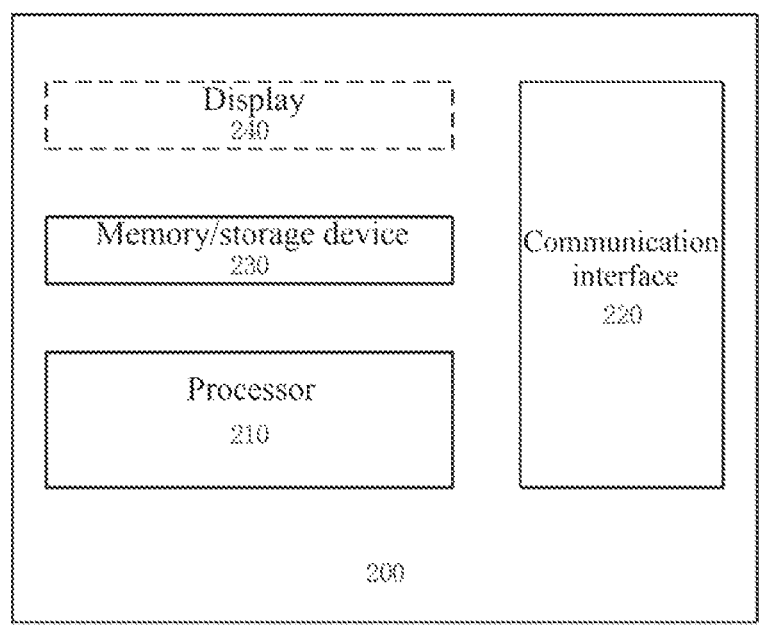
FIG. 2 is a block diagram illustrating an exemplary computer system according to an embodiment of the present disclosure.

FIG. 2 illustrates a block diagram of an exemplary computer system 200 configured to implement various functions disclosed herein. For example, the computer system 200 may be configured as a server to create or reconstruct a VR environment 100. In another example, the computer system 200 may be configured as a terminal device to display or enrich the VR environment 100. As shown in FIG. 2, the computer system 200 may include a processor 210, a communication interface 220, a memory/storage device 230, and a display 240. The memory/storage device 230 may be configured to store computer-readable instructions that, when executed by the processor 210, can enable the processor 210 to perform various operations disclosed herein. The memory 230 may be any non-transitory type of mass storage device, such as volatile or non-volatile, magnetic, semiconductor-based, tape-based, optical, removable, non-removable, or other type of storage device or tangible computer-readable medium, including but not limited to, a ROM, a flash memory, a dynamic RAM, and a static RAM.

The processor 210 may be configured to perform the operations in accordance with the instructions stored in the memory 230. The processor 210 may include any appropriate type of general-purpose or dedicated microprocessor, digital signal processor, microcontroller, or the like. The processor 210 may be configured as a separate processor module dedicated to performing one or more specific operations disclosed herein. Alternatively, the processor 210 may be configured as a shared processor module capable of performing other operations unrelated to the one or more specific operations disclosed herein.

The communication interface 220 may be configured to communicate information between the computer system 200 and other devices or systems. For example, the communication interface 220 may include an integrated service digital network (ISDN) card, a cable modem, a satellite modem, or a modem to provide a data communication connection. As another example, the communication interface 220 may include a local area network (LAN) card to provide a data communication connection to a compatible LAN. As a further example, the communication interface 220 may include a high-speed network adapter such as a fiber optic network adaptor, 10G Ethernet adaptor, or the like. The communication interface 220 may also implement wireless links. In such an implementation, the communication interface 220 can send and receive, via a network, electrical, electromagnetic or optical signals that carry digital data streams representing various types of information. The network can typically include a cellular communication network, a Wireless Local Area Network (WLAN), a Wide Area Network (WAN), or the like.

The communication interface 220 may also include various I/O devices such as a keyboard, a mouse, a touchpad, a touch screen, a microphone, a camera, a biosensor, or the like. A user may input data to a terminal device through the communication interface 220.

The display 240 may be integrated as part of the computer system 200 or may be provided as a separate device communicatively coupled to the computer system 200. The display 240 may include a display device such as a Liquid Crystal Display (LCD), a Light Emitting Diode Display (LED), a plasma display, or any other type of display, and provide a Graphical User Interface (GUI) presented on the display for user input and data depiction. In some embodiments, the display device 240 may include a VR goggle, a pair of VR glasses, or other similar devices that provide immersive VR experience. For example, the VR environment 100 may be displayed on the display 240. In some embodiments, the display 240 may be integrated as a part of the communication interface 220.

Figure 3:
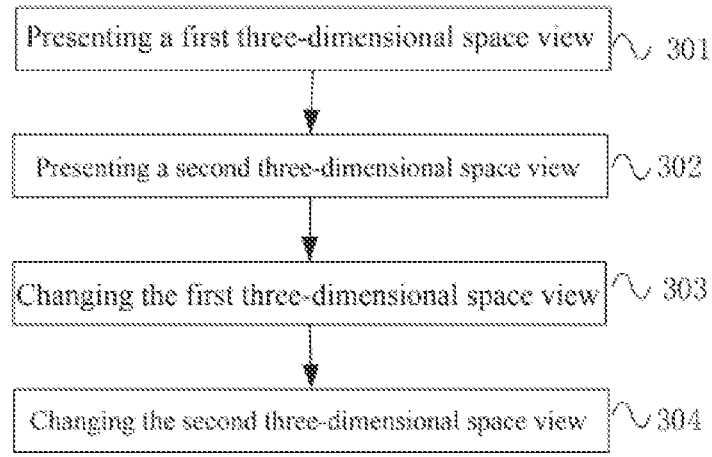
FIG. 3 is a flowchart of a method for displaying a three-dimensional space view provided in an embodiment of the present disclosure.

FIG. 3 is a flowchart of an example method for displaying a three-dimensional space view according to the present disclosure. The three-dimensional space view at least includes a first three-dimensional space view and a second three-dimensional space view, and the method includes: step 301, presenting the first three-dimensional space view on a first user interface; step 302, presenting the second three-dimensional space view on a second user interface; step 303, changing the first three-dimensional space view according to a user input; and step 304, changing the second three-dimensional space view according to a change in the first three-dimensional space view.

Figure 4:
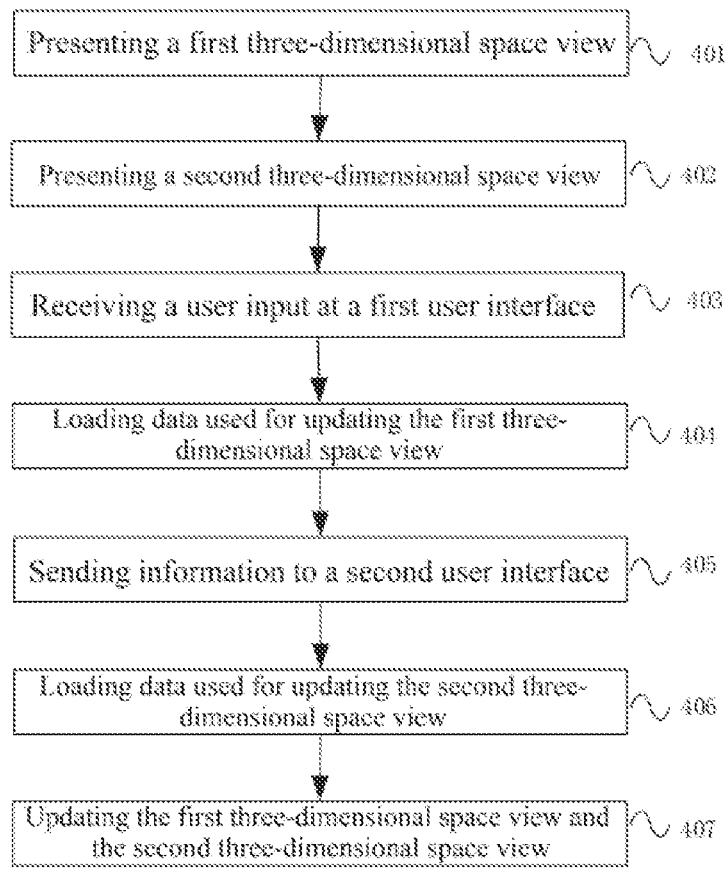
FIG. 4 is a flowchart of another method for displaying a three-dimensional space view provided in an embodiment of the present disclosure.

FIG. 4 is a flowchart of another example method for displaying a three-dimensional space view according to the present disclosure. The three-dimensional space view at least includes a first three-dimensional space view and a second three-dimensional space view.

As shown in FIG. 4, in step 401, the first three-dimensional space view is presented on a first user interface.

In step 402, the second three-dimensional space view is presented on a second user interface. The presented second three-dimensional space view and first three-dimensional space view may have the same field of view.

The first user interface and the second user interface may be child pages, for example, a first child page and a second child page of a browser (e.g., an IE browser, a Chrome browser, or the like).

A three-dimensional space view may also be referred to as a panoramic view. A method for generating a three-dimensional space view of an apartment (i.e., an apartment panorama) is such that the surrounding environments of a plurality of positions in the apartment are taken photos by means of a camera, and these photos are synthesized to obtain the apartment panorama of these positions. For example, the camera may be rotated about a vertical axis in a horizontal direction and rotated about a horizontal axis in a vertical direction at a certain position in the apartment, and a series of photos taken therefrom are synthesized to obtain an apartment panorama of this position. Another method is such that a three-dimensional space view of an apartment is generated by computer simulation.

A field of view generally includes a direction of the field of view and an angle range of the field of view, and the direction of the field of view is also referred to as a line-of-sight direction of the field of view. Therefore, one feature of the field of view is the direction thereof, which for example may be defined by an azimuth angle measured in a known direction (for example, a north direction) and an inclination angle measured in a known direction (for example, a horizontal plane). Another feature of the field of view is an angle range of a given scenario.

In step 403, a user input is received at the first user interface, to generate a view change instruction of the first three-dimensional space view according to the user input.

A user can manipulate a three-dimensional space view in a display region (i.e., a user interface). The user can change the direction and the angle range of the field of view through left and right, up and down dragging operations. The user can also change the angle range of the field of view through a scaling operation. In some implementations, the user can be navigated from a three-dimensional space view of one position to a three-dimensional space view of another position by clicking a navigation control superimposed on the three-dimensional space view.

In some implementations, a panoramic image may be generated from m positions in a first apartment (the m locations constitute a first position set), and a panoramic image is generated from n positions in a second apartment (the n locations constitute a second position set). Here, n and m are integers, and may be the same or different. The m and n positions may be numbered respectively (for example, consecutive numbering starts from 1), that is, a position is represented by a number, and a position of a first number (for example, number 1) represents an initial position. Positions with the same number are considered as corresponding positions, and thus a mapping relationship between the first position set and the second position set is established. The first apartment and the second apartment may be the same apartment, that is, different panoramic images may be generated for the same apartment. For example, different three-dimensional space views before and after decoration can be generated for the same apartment, a first three-dimensional space view is generated for the apartment before decoration, and a second three-dimensional space view is generated for the apartment after decoration.

In some implementations, the view change instruction includes field-of-view change information and/or number (or position, which is also referred to as a point position) change information of the first three-dimensional space view.

In step 404, the first user interface loads, according to the view change instruction, data used for updating the first three-dimensional space view.

In step 405, the first user interface sends the view change instruction to the second user interface.

In step 406, the second user interface loads, according to the view change instruction, data used for updating the second three-dimensional space view.

In step 407, the first user interface and the second user interface update the first three-dimensional space view and the second three-dimensional space view respectively according to the loaded data used for updating the first three-dimensional space view and the loaded data used for updating the second three-dimensional space view.

In some implementations, after the updating, the first three-dimensional space view and the second three-dimensional space view have the same field of view. In some implementations, after the updating, the first three-dimensional space view and the second three-dimensional space view correspond to the same position (or number).

In some implementations, the first user interface and the second user interface update the first three-dimensional space view and the second three-dimensional space view at the same time respectively according to the loaded data used for the first three-dimensional space view and the loaded data used for the second three-dimensional space view. That is, the first user interface loads the data used for updating the first three-dimensional space view, the second user interface loads the data used for updating the second three-dimensional space view, and then synchronization is performed on the two user interfaces to update the first three-dimensional space view and the second three-dimensional space view at the same time. The synchronization for example includes: the first user interface notifying the second user interface that the first user interface has completed data loading, and the second user interface notifying the first user interface that the second user interface has completed data loading, thus implementing that the first user interface and the second user interface update the first three-dimensional space view and the second three-dimensional space view at the same time.

An application scenario of the above method for displaying a three-dimensional space view is to display three-dimensional models of the apartment before and after decoration on the same screen. In the scenario of displaying three-dimensional models of the apartment before and after decoration on the same screen, changing the first three-dimensional space view according to a user input includes: acquiring, by a user terminal, field-of-view change information of a user during roaming and/or glancing in the first three-dimensional space view (which is also referred to as a current three-dimensional virtual space). The field-of-view change information for example may include point position (or position) change information and/or line-of-sight direction change information. Changing the second three-dimensional space view according to a change in the first three-dimensional space view includes: adjusting a display field of view of a second three-dimensional model of the apartment according to the field-of-view change information if the first three-dimensional space view corresponds to a first three-dimensional model of the apartment and the second three-dimensional space view corresponds to the second three-dimensional model of the apartment, such that the first three-dimensional model of the apartment and the second three-dimensional model of the apartment are displayed on the same screen at the same field of view; and adjusting a display field of view of the first three-dimensional model of the apartment according to the field-of-view change information if the first three-dimensional space view corresponds to the second three-dimensional model of the apartment and the second three-dimensional space view corresponds to the first three-dimensional model of the apartment, such that the first three-dimensional model of the apartment and the second three-dimensional model of the apartment are displayed on the same screen at the same field of view.

Displaying three-dimensional models of the apartment before and after decoration on the same screen is described in detail below.

FIG. 5 is a flowchart of a method for displaying three-dimensional models of an apartment before and after decoration on the same screen provided in an embodiment of the present disclosure. As shown in FIG. 5, the method includes:

step 501, acquiring, by a user terminal, field-of-view change information of a user during roaming and/or glancing in a current three-dimensional virtual space; the field-of-view change information including point position change information and/or line-of-sight direction change information;

step 502, adjusting a display field of view of the second three-dimensional model of the apartment according to the field-of-view change information if the current three-dimensional virtual space corresponds to the first three-dimensional model of the apartment, such that the first three-dimensional model of the apartment and the second three-dimensional model of the apartment are displayed on the same screen at the same field of view;

step 503, adjusting a display field of view of the first three-dimensional model of the apartment according to the field-of-view change information if the current three-dimensional virtual space corresponds to the second three-dimensional model of the apartment, such that the first three-dimensional model of the apartment and the second three-dimensional model of the apartment are displayed on the same screen at the same field of view.

The first apartment model and the second apartment model have been displayed on the same screen at the same field of view before the field of view of the user changes, the first three-dimensional model of the apartment is a three-dimensional model of a current apartment (that is, a three-dimensional model of the apartment for which a recommended decoration effect is not loaded), and the second three-dimensional model of the apartment is a three-dimensional model of a decorated apartment for which the recommended decoration effect is loaded.

The three-dimensional model of the current apartment is a three-dimensional model of the apartment of an actual apartment (a three-dimensional model of the apartment before decoration). The three-dimensional model of the decorated apartment is a three-dimensional model of the apartment that is obtained after decoration simulation on the basis of the corresponding actual apartment (a three-dimensional model of the apartment after decoration).

The recommended decoration effect is a decoration effect obtained, based on attributes of an apartment of a user such as the apartment layout, the orientation, the light, and the story, by adding various furniture and appliance models in the three-dimensional model of the apartment after all decorated furniture and appliances of the apartment are removed from the original three-dimensional model of the apartment of the user.

The user can wander and/or glance in a three-dimensional virtual space (VR space) for the three-dimensional model of the apartment, so as to realize an effect of being physically present in the apartment. For example, wandering means moving from one point position to another point position; and glancing means looking towards a certain region in a room. Before the field of view of the user during roaming and/or glancing changes, the three-dimensional model of the apartment before decoration and the three-dimensional model of the apartment after decoration are displayed on the display interface of a user terminal (a front end) on the same screen at the same field of view. The user can wander and/or glance in a three-dimensional virtual space of the three-dimensional model of the apartment before decoration, or in a three-dimensional virtual space of the three-dimensional model of the apartment after decoration.

When the user glances at one point position, the line-of-sight direction can be changed (e.g., by sliding on a screen), to realize glancing for different regions in the room. When the user moves from one point position to another point position, the field of view inevitably changes, and the user can further change the line-of-sight direction after moving to a new point position, such that a new change occurs in the field of view.

Therefore, the user changing the field of view at the same point position can be implemented by acquiring line-of-sight direction change information; when the user moves from one point position to another point position, the field-of-view change information can be acquired by acquiring the point position change information; and when the user moves from one point position to another point position, and further changes the line-of-sight direction, the field-of-view change information can be acquired from the point position change information and the line-of-sight direction change information.

When the user roams and/or glances in a three-dimensional virtual space of a three-dimensional model of the apartment, the user terminal acquires information of the current three-dimensional virtual space in which the user is located, where the current three-dimensional virtual space corresponds to the three-dimensional model of the apartment before decoration or corresponds to the three-dimensional model of the apartment after decoration; and acquires field-of-view change information of the user during roaming and/or glancing in the current three-dimensional virtual space.

If the current three-dimensional virtual space corresponds to the three-dimensional model of the apartment before decoration, the user terminal adjusts a display field of view of the three-dimensional model of the apartment after decoration according to field-of-view change information of the user during roaming and/or glancing in the three-dimensional virtual space of the three-dimensional model of the apartment before decoration, such that the three-dimensional model of the apartment after decoration and the three-dimensional model of the apartment before decoration are consistent in terms of an field-of-view change, to implement that the three-dimensional model of the apartment before decoration and the three-dimensional model of the apartment after decoration are displayed on the same screen at the same field of view.

If the current three-dimensional virtual space corresponds to the three-dimensional model of the apartment after decoration, the user terminal adjusts a display field of view of the three-dimensional model of the apartment before decoration according to field-of-view change information of the user during roaming and/or glancing in the three-dimensional virtual space of the three-dimensional model of the apartment after decoration, such that the three-dimensional model of the apartment before decoration and the three-dimensional model of the apartment after decoration are consistent in terms of an field-of-view change, to implement that the three-dimensional model of the apartment before decoration and the three-dimensional model of the apartment after decoration are displayed on the same screen at the same field of view.

In an embodiment of the present disclosure, a display field of view of a three-dimensional model of the apartment after decoration is adjusted according to field-of-view change information of a user during roaming and/or glancing in a three-dimensional virtual space of a three-dimensional model of the apartment before decoration, or a display field of view of the three-dimensional model of the apartment before decoration is adjusted according to field-of-view change information of the user during roaming and/or glancing in a three-dimensional virtual space of the three-dimensional model of the apartment after decoration, such that the three-dimensional model of the apartment before decoration and the three-dimensional model of the apartment after decoration are linked to the same screen at the same field of view, and the user visually observes the difference between the two three-dimensional models of the apartment before and after decoration, thus providing the user with a real feeling of decoration effect exhibition.

Further, based on the embodiments described above, acquiring field-of-view change information of a user during roaming and/or glancing in a current three-dimensional virtual space specifically includes: acquiring, through a child page of a three-dimensional model of the apartment that corresponds to the current three-dimensional virtual space, the field-of-view change information of the user during roaming and/or glancing in the current three-dimensional virtual space; adjusting a display field of view of a second three-dimensional model of the apartment according to the field-of-view change information if the current three-dimensional virtual space corresponds to the first three-dimensional model of the apartment specifically includes: reporting, through a child page of the first three-dimensional model of the apartment, the field-of-view change information to a parent page, the parent page then delivering the field-of-view change information to a child page of the second three-dimensional model of the apartment, where the child page of the second three-dimensional model of the apartment adjusts the display field of view of the second three-dimensional model of the apartment according to the field-of-view change information; adjusting a display field of view of the first three-dimensional model of the apartment according to the field-of-view change information if the current three-dimensional virtual space corresponds to the second three-dimensional model of the apartment specifically includes: reporting, through the child page of the second three-dimensional model of the apartment, the field-of-view change information to the parent page, the parent page then delivering the field-of-view change information to the child page of the first three-dimensional model of the apartment, where the child page of the first three-dimensional model of the apartment adjusts the display field of view of the first three-dimensional model of the apartment according to the field-of-view change information. Certainly, the present disclosure is not limited thereto, communication may be directly performed between child pages without going through the parent page.

In the case where communication is directly performed between child pages without going through the parent page, adjusting a display field of view of the second three-dimensional model of the apartment according to the field-of-view change information if the current three-dimensional virtual space corresponds to the first three-dimensional model of the apartment specifically includes: sending, through the child page of the first three-dimensional model of the apartment, the field-of-view change information to the child page of the second three-dimensional model of the apartment, where the child page of the second three-dimensional model of the apartment adjusts the display field of view of the second three-dimensional model of the apartment according to the field-of-view change information. In the case where communication is directly performed between child pages without going through the parent page, adjusting a display field of view of the first three-dimensional model of the apartment according to the field-of-view change information if the current three-dimensional virtual space corresponds to the second three-dimensional model of the apartment specifically includes: sending, through the child page of the second three-dimensional model of the apartment, the field-of-view change information to the child page of the first three-dimensional model of the apartment, where the child page of the first three-dimensional model of the apartment adjusts the display field of view of the first three-dimensional model of the apartment according to the field-of-view change information.

The child page refers to a display page corresponding to each three-dimensional model of the apartment in the user terminal. The parent page refers to a page manager used to manage and control each child page in the user terminal. In an embodiment of the present disclosure, page synchronization of three-dimensional models of the apartment before and after decoration can be realized through relay control of the parent page, or page synchronization of three-dimensional models of the apartment before and after decoration is realized by directly performing communication between child pages without going through the parent page.

If the current three-dimensional virtual space corresponds to the three-dimensional model of the apartment before decoration, a child page of the three-dimensional model of the apartment before decoration acquires field-of-view change information of the user during roaming and/or glancing in the current three-dimensional virtual space, and reports the field-of-view change information to the parent page; the parent page then delivers the field-of-view change information to a child page of the three-dimensional model of the apartment after decoration; and the child page of the three-dimensional model of the apartment after decoration adjusts the display field of view of the three-dimensional model of the apartment after decoration according to the field-of-view change information, such that the three-dimensional model of the apartment before decoration and the three-dimensional model of the apartment after decoration are displayed on the same screen at the same field of view. Alternatively, the child page of the three-dimensional model of the apartment before decoration acquires the field-of-view change information of the user during roaming and/or glancing in the current three-dimensional virtual space, and directly sends the field-of-view change information to the child page of the three-dimensional model of the apartment after decoration, and the child page of the three-dimensional model of the apartment after decoration adjusts the display field of view of the three-dimensional model of the apartment after decoration according to the field-of-view change information, such that the three-dimensional model of the apartment before decoration and the three-dimensional model of the apartment after decoration are displayed on the same screen at the same field of view.

If the current three-dimensional virtual space corresponds to the three-dimensional model of the apartment after decoration, the child page of the three-dimensional model of the apartment after decoration acquires field-of-view change information of the user during roaming and/or glancing in the current three-dimensional virtual space, and reports the field-of-view change information to the parent page; the parent page then delivers the field-of-view change information to the child page of three-dimensional model of the apartment before decoration; and the child page of the three-dimensional model of the apartment before decoration adjusts the display field of view of the three-dimensional model of the apartment before decoration according to the field-of-view change information, such that the three-dimensional model of the apartment before decoration and the three-dimensional model of the apartment after decoration are displayed on the same screen at the same field of view. Alternatively, the child page of the three-dimensional model of the apartment after decoration acquires the field-of-view change information of the user during roaming and/or glancing in the current three-dimensional virtual space, and directly sends the field-of-view change information to the child page of the three-dimensional model of the apartment before decoration, and the child page of the three-dimensional model of the apartment before decoration adjusts the display field of view of the three-dimensional model of the apartment before decoration according to the field-of-view change information, such that the three-dimensional model of the apartment before decoration and the three-dimensional model of the apartment after decoration are displayed on the same screen at the same field of view.

Based on the embodiments described above, in an embodiment of the present disclosure, a parent page is used to control a child page of a three-dimensional model of the apartment before decoration and a child page of a three-dimensional model of the apartment after decoration (or communication is directly performed between the child page of the three-dimensional model of the apartment before decoration and the child page of the three-dimensional model of the apartment after decoration), such that the three-dimensional model of the apartment before decoration and the three-dimensional model of the apartment after decoration are displayed on the same screen at the same field of view, thus improving the convenience and reliability of controlling displaying on the same screen at the same angle.

Further, based on the embodiments described above, before acquiring field-of-view change information of a user during roaming and/or glancing in a current three-dimensional virtual space, the method further includes: displaying the first three-dimensional model of the apartment, acquiring field-of-view information of the first three-dimensional model of the apartment, acquiring the second three-dimensional model of the apartment from a back-end server, and displaying the second three-dimensional model of the apartment according to the field-of-view information of the first three-dimensional model of the apartment, such that the first three-dimensional model of the apartment and the second three-dimensional model of the apartment are displayed on the same screen at the same field of view; or displaying the second three-dimensional model of the apartment, acquiring field-of-view information of the second three-dimensional model of the apartment, acquiring the first three-dimensional model of the apartment from the back-end server, and displaying the first three-dimensional model of the apartment according to the field-of-view information of the second three-dimensional model of the apartment, such that the first three-dimensional model of the apartment and the second three-dimensional model of the apartment are displayed on the same screen at the same field of view, where the field-of-view information includes point position information and line-of-sight direction information.

As described above, before the three-dimensional model of the apartment before decoration and the three-dimensional model of the apartment after decoration are linked to the same screen at the same field of view, the three-dimensional model of the apartment before decoration and the three-dimensional model of the apartment after decoration are displayed on the same screen at the same field of view. Then, based on the embodiments described above, an embodiment of the present disclosure will provide the embodiment that the three-dimensional model of the apartment before decoration and the three-dimensional model of the apartment after decoration are initially displayed on the same screen at the same field of view.

In an APP of a user terminal, a user can enter, by clicking a certain three-dimensional model of the apartment, a virtual space of the three-dimensional model of the apartment for glancing and wandering, so as to realize display of the corresponding three-dimensional model of the apartment. For example, the user can click a three-dimensional model of the apartment before decoration, to realize display of the three-dimensional model of the apartment before decoration; or click a three-dimensional model of the apartment after decoration, to realize display of the three-dimensional model of the apartment after decoration. The three-dimensional model of the apartment before decoration and the three-dimensional model of the apartment after decoration are both stored in a back-end server, and the user terminal can send, to the back-end server, a request instruction for displaying a corresponding three-dimensional model.

If the user terminal acquires display request information of the three-dimensional model of the apartment before decoration (e.g., acquiring click information of the user on the three-dimensional model of the apartment before decoration), the three-dimensional model of the apartment before decoration is displayed. In order to realize display of the three-dimensional model of the apartment before decoration and the three-dimensional model of the apartment after decoration on the same screen at the same field of view, after displaying the three-dimensional model of the apartment before decoration, the user terminal acquires field-of-view information (information of the display field of view) of the three-dimensional model of the apartment before decoration, acquires the three-dimensional model of the apartment after decoration from the back-end server, and displays the three-dimensional model of the apartment after decoration according to the field-of-view information of the three-dimensional model of the apartment before decoration, such that the three-dimensional model of the apartment before decoration and the three-dimensional model of the apartment after decoration are displayed on the same screen at the same field of view.

Specifically, the field-of-view information of the three-dimensional model of the apartment before decoration may be sent to a parent page through a child page of the three-dimensional model of the apartment before decoration, the parent page then delivers the field-of-view information of the three-dimensional model of the apartment before decoration to a child page of the three-dimensional model of the apartment after decoration, and the child page of the three-dimensional model of the apartment after decoration displays the three-dimensional model of the apartment after decoration according to the field-of-view information of the three-dimensional model of the apartment before decoration, such that the three-dimensional model of the apartment before decoration and the three-dimensional model of the apartment after decoration are displayed on the same screen at the same field of view. Alternatively, the field-of-view information of the three-dimensional model of the apartment before decoration may be directly sent to the child page of the three-dimensional model of the apartment after decoration through the child page of the three-dimensional model of the apartment before decoration, and the child page of the three-dimensional model of the apartment after decoration displays the three-dimensional model of the apartment after decoration according to the field-of-view information of the three-dimensional model of the apartment before decoration, such that the three-dimensional model of the apartment before decoration and the three-dimensional model of the apartment after decoration are displayed on the same screen at the same field of view.

If the user terminal acquires display request information of the three-dimensional model of the apartment after decoration (e.g., acquiring click information of the user on the three-dimensional model of the apartment after decoration), the three-dimensional model of the apartment after decoration is displayed. In order to realize display of the three-dimensional model of the apartment before decoration and the three-dimensional model of the apartment after decoration on the same screen at the same field of view, after displaying the three-dimensional model of the apartment after decoration, the user terminal acquires field-of-view information (information of the display field of view) of the three-dimensional model of the apartment after decoration, acquires the three-dimensional model of the apartment before decoration from the back-end server, and displays the three-dimensional model of the apartment before decoration according to the field-of-view information of the three-dimensional model of the apartment after decoration, such that the three-dimensional model of the apartment before decoration and the three-dimensional model of the apartment after decoration are displayed on the same screen at the same field of view.

Specifically, the field-of-view information of the three-dimensional model of the apartment after decoration may be sent to the parent page through the child page of the three-dimensional model of the apartment after decoration, the parent page then delivers the field-of-view information of the three-dimensional model of the apartment after decoration to the child page of the three-dimensional model of the apartment before decoration, and the child page of the three-dimensional model of the apartment before decoration displays the three-dimensional model of the apartment before decoration according to the field-of-view information of the three-dimensional model of the apartment after decoration, such that the three-dimensional model of the apartment before decoration and the three-dimensional model of the apartment after decoration are displayed on the same screen at the same field of view. Alternatively, the field-of-view information of the three-dimensional model of the apartment after decoration may be directly sent to the child page of the three-dimensional model of the apartment before decoration through the child page of the three-dimensional model of the apartment after decoration, and the child page of the three-dimensional model of the apartment before decoration displays the three-dimensional model of the apartment before decoration according to the field-of-view information of the three-dimensional model of the apartment after decoration, such that the three-dimensional model of the apartment before decoration and the three-dimensional model of the apartment after decoration are displayed on the same screen at the same field of view.

Based on the embodiments described above, in an embodiment of the present disclosure, a three-dimensional model of the apartment after decoration is displayed according to field-of-view information of a three-dimensional model of the apartment before decoration, or the three-dimensional model of the apartment before decoration is displayed according to field-of-view information of the three-dimensional model of the apartment after decoration, such that the three-dimensional model of the apartment before decoration and the three-dimensional model of the apartment after decoration are initially displayed on the same screen at the same field of view.

Further, based on the embodiments described above, before acquiring field-of-view change information of the first three-dimensional model of the apartment, the method further includes: determining whether preset triggering information is received, and if it is determined that the preset triggering information is received, performing the action of acquiring field-of-view information of the first three-dimensional model of the apartment; and before acquiring field-of-view change information of the second three-dimensional model of the apartment, the method further includes: determining whether the preset triggering information is received, and if it is determined that the preset triggering information is received, performing the action of acquiring field-of-view information of the second three-dimensional model of the apartment.

Initial display of the three-dimensional model of the apartment before decoration and the three-dimensional model of the apartment after decoration on the same screen at the same field of view may be triggered by a preset triggering condition.

If the user terminal acquires the display request information of the three-dimensional model of the apartment before decoration, the three-dimensional model of the apartment before decoration is displayed, and it is determined whether preset triggering information is received, where the preset triggering information may be click information of the user on a preset button (e.g., a button for displaying on the same screen before and after decoration). If it is determined that the preset triggering information is received, the field-of-view information of the three-dimensional model of the apartment before decoration is acquired, the three-dimensional model of the apartment after decoration is acquired from the back-end server, and the three-dimensional model of the apartment after decoration is displayed according to the field-of-view information of the three-dimensional model of the apartment before decoration, such that the three-dimensional model of the apartment before decoration and the three-dimensional model of the apartment after decoration are displayed on the same screen at the same field of view. If it is determined that the preset triggering information is not received, only the three-dimensional model of the apartment before decoration is displayed.

If the user terminal acquires the display request information of the three-dimensional model of the apartment after decoration, the three-dimensional model of the apartment after decoration is displayed, and it is determined whether preset triggering information is received, where the preset triggering information may be click information of the user on the preset button (e.g., the button for displaying on the same screen before and after decoration). If it is determined that the preset triggering information is received, the field-of-view information of the three-dimensional model of the apartment after decoration is acquired, the three-dimensional model of the apartment before decoration is acquired from the back-end server, and the three-dimensional model of the apartment before decoration is displayed according to the field-of-view information of the three-dimensional model of the apartment after decoration, such that the three-dimensional model of the apartment before decoration and the three-dimensional model of the apartment after decoration are displayed on the same screen at the same field of view. If it is determined that the preset triggering information is not received, only the three-dimensional model of the apartment after decoration is displayed.

Based on the embodiments described above, in an embodiment of the present disclosure, a three-dimensional model of the apartment before decoration and a three-dimensional model of the apartment after decoration are displayed on the same screen at the same field of view after preset triggering information is received, thus improving the flexibility of display control.

Further, based on the embodiments described above, the method further includes: acquiring, by a back-end server, preset apartment information according to the first three-dimensional model of the apartment, where the preset apartment information includes apartment layout information, story height information and point position information; generating, according to the preset apartment information, a three-dimensional model of a vacant apartment that corresponds to the first three-dimensional model of the apartment; adding a three-dimensional model of furniture and appliances to the three-dimensional model of the vacant apartment to generate the second three-dimensional model of the apartment; storing the first three-dimensional model of the apartment and the second three-dimensional model of the apartment correspondingly.

As described above, the three-dimensional model of the apartment before decoration and the three-dimensional model of the apartment after decoration are stored in the back-end server. The three-dimensional model of the apartment before decoration is implemented by steps such as acquiring three-dimensional point cloud data of an actual apartment and three-dimensional modeling. Based on the embodiments described above, an embodiment of the present disclosure will provide that the back-end server acquires the three-dimensional model of the apartment after decoration.

The back-end server acquires the preset apartment information according to the three-dimensional model of the apartment before decoration, where the preset apartment information includes apartment layout information, story height information and point position information. It can be understood that the apartment layout information can also be acquired according to an apartment layout image. The back-end server generates, according to the preset apartment information, a three-dimensional model of a vacant apartment that corresponds to the three-dimensional model of the apartment before decoration. The three-dimensional model of the vacant apartment is generated according to the apartment layout and the story height of an actual apartment that corresponds to the three-dimensional model of the apartment before decoration, and consistent arrangement for point position information is performed according to point position information of the three-dimensional model of the apartment before decoration. In addition, the three-dimensional model of the vacant apartment may include preliminary home decoration information such as floor decoration information.

The three-dimensional model of the furniture and appliances may be acquired from a third party, or may be extracted from point cloud data of a large number of actual apartments. The corresponding three-dimensional model of the furniture and appliances is added to the three-dimensional model of the vacant apartment according to information such as the apartment layout, and a three-dimensional model of each of the furniture and appliances is placed at a corresponding position, for example, a three-dimensional model of a sofa is placed in a living room, so as to generate a three-dimensional model of the apartment after decoration. The back-end server stores the three-dimensional model of the apartment before decoration and the three-dimensional model of the apartment after decoration correspondingly for being displayed on the same screen at the same field of view.

Based on the embodiments described above, in an embodiment of the present disclosure, a three-dimensional model of a vacant apartment is generated according to preset apartment information of a three-dimensional model of the apartment before decoration, and then a three-dimensional model of furniture and appliances is added to the three-dimensional model of the vacant apartment to generate a three-dimensional model of the apartment after decoration, such that the three-dimensional model of the apartment after decoration is effectively acquired, which provides a basis for displaying the three-dimensional model of the apartment before decoration and the three-dimensional model of the apartment after decoration on the same screen at the same field of view.

Further, based on the embodiments described above, adding a three-dimensional model of furniture and appliances to the three-dimensional model of the vacant apartment specifically includes: automatically adding the corresponding three-dimensional model of the furniture and appliances to the three-dimensional model of the vacant apartment, where the three-dimensional model of the furniture and appliances is a three-dimensional model generated in advance.

The three-dimensional model of the furniture and appliances is a three-dimensional model generated in advance. The three-dimensional model of the furniture and appliances may be added to the three-dimensional model of the vacant apartment in an artificial intelligence manner, so as to obtain the three-dimensional model of the apartment after decoration, or the three-dimensional model of the furniture and appliances may be manually added.

If the three-dimensional model of the furniture and appliances is added to the three-dimensional model of the vacant apartment in an artificial intelligence manner, a furniture and appliance adding model needs to be obtained by means of machine learning and training. In training samples, the three-dimensional model of the apartment after decoration is used as an output, the three-dimensional model of the vacant apartment and the three-dimensional model of the furniture and appliances in the vacant apartment which correspond to the three-dimensional model of the apartment after decoration are used as inputs. The furniture and appliance adding model is obtained from a large number of training samples by means of machine learning and training, and the furniture and appliance adding model is used to automatically add the corresponding three-dimensional model of the furniture and appliances to the three-dimensional model of the vacant apartment, so as to generate the three-dimensional model of the apartment after decoration.

In an embodiment of the present disclosure, a corresponding three-dimensional model of the furniture and appliances is automatically added to a three-dimensional model of the vacant apartment, so as to generate a three-dimensional model of the apartment after decoration, thus improving the efficiency of generating the three-dimensional model of the apartment after decoration.

Further, based on the embodiments described above, both the three-dimensional model of the apartment before decoration and the three-dimensional model of the apartment after decoration can realize switching display of a VR reality image, a three-dimensional model image and an apartment layout image.

Figure 6:
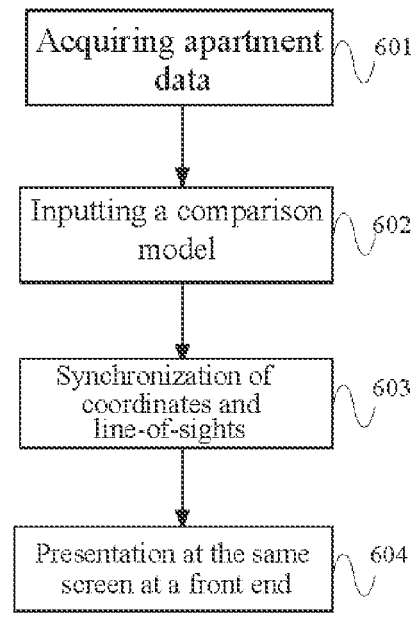
FIG. 6 is a flowchart of a method for displaying three-dimensional models of an apartment before and after decoration on the same screen provided in another embodiment of the present disclosure.

FIG. 6 is a flowchart of a method for displaying three-dimensional models of an apartment before and after decoration on the same screen provided in another embodiment of the present disclosure. As shown in FIG. 6, the method for displaying three-dimensional models of an apartment before and after decoration on the same screen provided in an embodiment of the present disclosure can realize convenient comparison before and after decoration. The method includes steps of acquiring apartment data 601, inputting a comparison model 602, synchronizing coordinates and line-of-sights 603, and synchronously presenting at a front end 604, featured by real-time and synchronism.

First, an empty three-dimensional model is generated at the back-end according to data such as an apartment layout image of an existing apartment, and then an existing furniture model is placed into the three-dimensional model to generate a three-dimensional model after decoration according to the existing three-dimensional model of the apartment, and then the two existing models are input to the back-end. Especially for apartments such as a roughcast apartment and a simply decorated apartment with obvious contrasts before and after decoration, the two three-dimensional spaces with obvious contrasts can provide a user with more visualization information.

When the user roams and glances in a three-dimensional space, the front-end needs to analyze coordinates and line-of-sights of the user within a current field-of-view picture, identify a point position of the user in the three-dimensional model, and trigger synchronization of the two three-dimensional models, so as to facilitate presentation of the two modes before and after decoration on the same screen. For example, when the user rotates the field of view in one child page, the child page in which the field of view is rotated reports an field-of-view change to a parent page, the parent page then delivers the field-of-view change to all child pages, so as to realize state synchronization of all the child pages, or the child page in which the field of view is rotated directly sends the field-of-view change to other child pages, so as to realize state synchronization of all the child pages. In addition, the user can perform interaction in both of two windows on the same screen, and click, according to his/her own demand, a corresponding model for viewing and comparison.

Based on the existing VR apartment-viewing, in order to realize a synchronous comparison of apartment models before and after decoration, in an embodiment of the present disclosure, two windows are presented on one screen of the front-end to presents different contents, and coordinates and field-of-views of a user are synchronized in different three-dimensional spaces to realize linkage of two three-dimensional models.

In an embodiment of the present disclosure, by acquiring VR data, apartment data, apartment layout data, and decoration data, a three-dimensional model after decoration is generated in advance in an intelligent manner based on the existing apartment data and is input into the back-end. At the front-end, a state of a child page touched by a user is uploaded to a parent page, and the parent page then delivers the state to other child pages (or the state of the child page touched by the user is directly sent to other child pages), and synchronism of information exhibition in three-dimensional spaces is guaranteed through field-of-view synchronization, panorama/model switching and point position switching.

Figure 7:
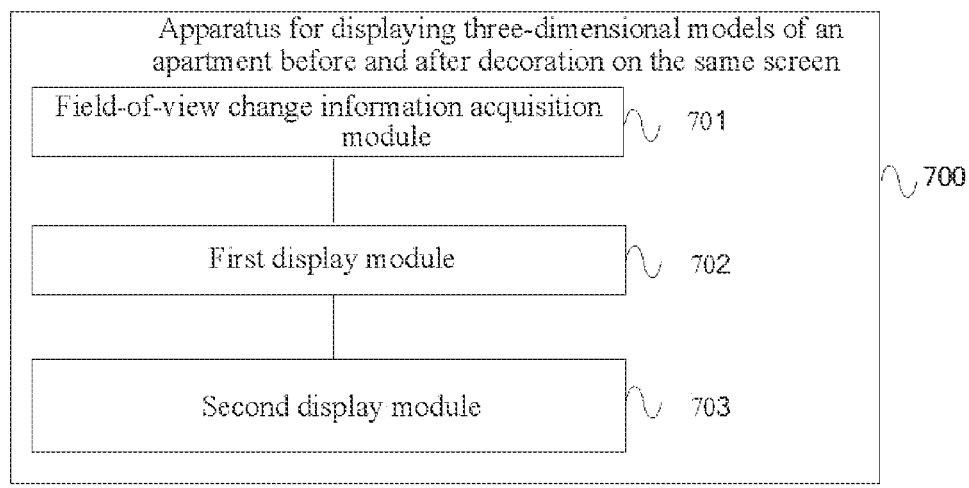
FIG. 7 is a schematic structural diagram of an apparatus for displaying three-dimensional models of an apartment before and after decoration on the same screen provided in an embodiment of the present disclosure.

FIG. 7 is a schematic structural diagram of an apparatus for displaying three-dimensional models of an apartment before and after decoration on the same screen provided in an embodiment of the present disclosure. As shown in FIG. 7, an apparatus 700 for displaying three-dimensional models of an apartment before and after decoration on the same screen includes an field-of-view change information acquisition module 701, a first display module 702, and a second display module 703. The field-of-view change information acquisition module 701 is configured to: acquire field-of-view change information of a user during roaming and/or glancing in a current three-dimensional virtual space, the field-of-view change information including point position change information and/or line-of-sight direction change information. The first display module 702 is configured to: adjust a display field of view of a second three-dimensional model of the apartment according to the field-of-view change information if the current three-dimensional virtual space corresponds to a first three-dimensional model of the apartment, such that the first three-dimensional model of the apartment and the second three-dimensional model of the apartment are displayed on the same screen at the same field of view. The second display module 703 is configured to: adjust a display field of view of the first three-dimensional model of the apartment according to the field-of-view change information if the current three-dimensional virtual space corresponds to the second three-dimensional model of the apartment, such that the first three-dimensional model of the apartment and the second three-dimensional model of the apartment are displayed on the same screen at the same field of view, where the first apartment model and the second apartment model have been displayed on the same screen at the same field of view before the field of view of the user changes, and the first three-dimensional model of the apartment is a three-dimensional model of a current apartment, and the second three-dimensional model of the apartment is a three-dimensional model of a decorated apartment obtained after a recommended decoration effect is loaded. The apparatus 700 for displaying three-dimensional models of an apartment before and after decoration on the same screen may be any of the user terminals described above.

In an embodiment of the present disclosure, a display field of view of a three-dimensional model of the apartment after decoration is adjusted according to field-of-view change information of a user during roaming and/or glancing in a three-dimensional virtual space of a three-dimensional model of the apartment before decoration, or a display field of view of the three-dimensional model of the apartment before decoration is adjusted according to field-of-view change information of the user during roaming and/or glancing in a three-dimensional virtual space of the three-dimensional model of the apartment after decoration, such that the three-dimensional model of the apartment before decoration and the three-dimensional model of the apartment after decoration are linked to the same screen at the same field of view, and the user visually observes the difference between the two three-dimensional models of the apartment before and after decoration, thus providing the user with a real feeling of decoration effect exhibition.

Further, based on the embodiments described above, the field-of-view change information acquisition module 701 is specifically configured to: acquire, through a child page of a three-dimensional model of the apartment that corresponds to the current three-dimensional virtual space, the field-of-view change information of the user during roaming and/or glancing in the current three-dimensional virtual space. The first display module 702 is configured to: report, through a child page of the first three-dimensional model of the apartment, the field-of-view change information to a parent page if the current three-dimensional virtual space corresponds to the first three-dimensional model of the apartment, the parent page then delivering the field-of-view change information to a child page of the second three-dimensional model of the apartment, where the child page of the second three-dimensional model of the apartment adjusts the display field of view of the second three-dimensional model of the apartment according to the field-of-view change information, such that the first three-dimensional model of the apartment and the second three-dimensional model of the apartment are displayed on the same screen at the same field of view. The second display module 703 is configured to: report, through the child page of the second three-dimensional model of the apartment, the field-of-view change information to the parent page if the current three-dimensional virtual space corresponds to the second three-dimensional model of the apartment, the parent page then delivering the field-of-view change information to the child page of the first three-dimensional model of the apartment, where the child page of the first three-dimensional model of the apartment adjusts the display field of view of the first three-dimensional model of the apartment according to the field-of-view change information, such that the first three-dimensional model of the apartment and the second three-dimensional model of the apartment are displayed on the same screen at the same field of view.

In other embodiments, the first display module 702 is configured to: directly send, through the child page of the first three-dimensional model of the apartment, the field-of-view change information to the child page of the second three-dimensional model of the apartment if the current three-dimensional virtual space corresponds to the first three-dimensional model of the apartment, where the child page of the second three-dimensional model of the apartment adjusts the display field of view of the second three-dimensional model of the apartment according to the field-of-view change information, such that the first three-dimensional model of the apartment and the second three-dimensional model of the apartment are displayed on the same screen at the same field of view. The second display module 703 is configured to: directly send, through the child page of the second three-dimensional model of the apartment, the field-of-view change information to the child page of the first three-dimensional model of the apartment if the current three-dimensional virtual space corresponds to the second three-dimensional model of the apartment, where the child page of the first three-dimensional model of the apartment adjusts the display field of view of the first three-dimensional model of the apartment according to the field-of-view change information, such that the first three-dimensional model of the apartment and the second three-dimensional model of the apartment are displayed on the same screen at the same field of view.

Based on the embodiments described above, in an embodiment of the present disclosure, a parent page is used to control a child page of a three-dimensional model of the apartment before decoration and a child page of a three-dimensional model of the apartment after decoration (or communication is directly performed between the child page of the three-dimensional model of the apartment before decoration and the child page of the three-dimensional model of the apartment after decoration), such that the three-dimensional model of the apartment before decoration and the three-dimensional model of the apartment after decoration are displayed on the same screen at the same field of view, thus improving the convenience and reliability of controlling displaying on the same screen at the same field of view.

Further, based on the embodiments described above, the first display module 702 is further configured to: display the first three-dimensional model of the apartment, acquire field-of-view information of the first three-dimensional model of the apartment, acquire the second three-dimensional model of the apartment from a back-end server, and display the second three-dimensional model of the apartment according to the field-of-view information of the first three-dimensional model of the apartment, such that the first three-dimensional model of the apartment and the second three-dimensional model of the apartment are displayed on the same screen at the same field of view. The second display module 703 is further configured to: display the second three-dimensional model of the apartment, acquire field-of-view information of the second three-dimensional model of the apartment, acquire the first three-dimensional model of the apartment from the back-end server, and display the first three-dimensional model of the apartment according to the field-of-view information of the second three-dimensional model of the apartment, such that the first three-dimensional model of the apartment and the second three-dimensional model of the apartment are displayed on the same screen at the same field of view, where the field-of-view information includes point position information and line-of-sight direction information.

Based on the embodiments described above, in an embodiment of the present disclosure, a three-dimensional model of the apartment after decoration is displayed according to field-of-view information of a three-dimensional model of the apartment before decoration, or the three-dimensional model of the apartment before decoration is displayed according to field-of-view information of the three-dimensional model of the apartment after decoration, such that the three-dimensional model of the apartment before decoration and the three-dimensional model of the apartment after decoration are initially displayed on the same screen at the same field of view.

Further, based on the embodiments described above, the first display module 702 is further configured to: determine whether preset triggering information is received, and if it is determined that the preset triggering information is received, perform the action of acquiring field-of-view information of the first three-dimensional model of the apartment. The second display module 703 is further configured to: determine whether the preset triggering information is received, and if it is determined that the preset triggering information is received, perform the action of acquiring field-of-view information of the second three-dimensional model of the apartment.

Based on the embodiments described above, in an embodiment of the present disclosure, a three-dimensional model of the apartment before decoration and a three-dimensional model of the apartment after decoration are displayed on the same screen at the same field of view after preset triggering information is received, thus improving the flexibility of display control.

Figure 8:
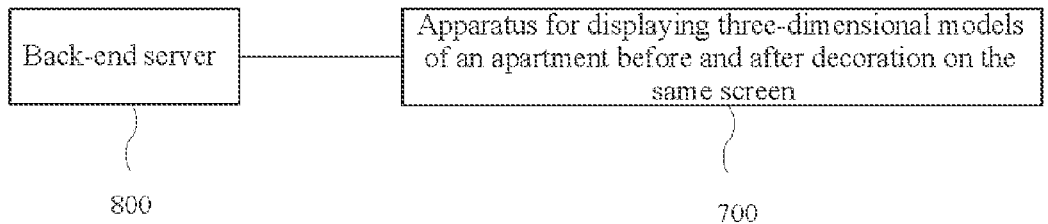
FIG. 8 is a schematic structural diagram of a system for displaying three-dimensional models of an apartment before and after decoration on the same screen provided in an embodiment of the present disclosure.

FIG. 8 is a schematic structural diagram of a system for displaying three-dimensional models of an apartment before and after decoration on the same screen provided in an embodiment of the present disclosure. As shown in FIG. 8, the system includes the apparatus 700 for displaying three-dimensional models of an apartment before and after decoration on the same screen and a back-end server 800. The back-end server 800 is specifically configured to: acquire preset apartment information according to the first three-dimensional model of the apartment, where the preset apartment information includes apartment layout information, story height information and point position information; generate, according to the preset apartment information, a three-dimensional model of a vacant apartment that corresponds to the first three-dimensional model of the apartment; add a three-dimensional model of furniture and appliances to the three-dimensional model of the vacant apartment to generate the second three-dimensional model of the apartment; and store the first three-dimensional model of the apartment and the second three-dimensional model of the apartment correspondingly.

In an embodiment of the present disclosure, a display field of view of a three-dimensional model of the apartment after decoration is adjusted according to field-of-view change information of a user during roaming and/or glancing in a three-dimensional virtual space of a three-dimensional model of the apartment before decoration, or a display field of view of the three-dimensional model of the apartment before decoration is adjusted according to field-of-view change information of the user during roaming and/or glancing in a three-dimensional virtual space of the three-dimensional model of the apartment after decoration, such that the three-dimensional model of the apartment before decoration and the three-dimensional model of the apartment after decoration are linked to the same screen at the same field of view, and the user visually observes the difference between the two three-dimensional models of the apartment before and after decoration, thus providing the user with a real feeling of decoration effect exhibition.

Further, based on the embodiments described above, the back-end server 800 is further configured to: automatically add the corresponding three-dimensional model of the furniture and appliances to the three-dimensional model of the vacant apartment, where the three-dimensional model of the furniture and appliances is a three-dimensional model generated in advance.

Based on the embodiments described above, in an embodiment of the present disclosure, a three-dimensional model of a vacant apartment is generated according to preset apartment information of a three-dimensional model of the apartment before decoration, and then the corresponding three-dimensional model of the furniture and appliances is automatically added to the three-dimensional model of the vacant apartment to generate a three-dimensional model of the apartment after decoration, such that the three-dimensional model of the apartment after decoration is quickly and effectively acquired.

The apparatus and system provided in an embodiment of the present disclosure are applied to the method described above. For specific functions, reference can be made to the method flows described above. Details are not repeatedly described herein.

In a process of implementing the present disclosure, the inventors also find that in a traditional decoration process, professional and experienced designers are required to propose retrofit designs, ordinary residents are often not competent, and the effect of furniture layout is heavily dependent on the professional designers, which requires a lot of time to design drawings and occupies a large number of designer resources. In addition, a design process is long, cumbersome and expensive.

In a method for generating a furniture placement plan based on an apartment layout provided in the present disclosure, a training sample set is generated and a neural network is trained, so as to obtain a neural network model; a to-be-decorated apartment layout image is processed with the neural network model and a preset furniture placement decision rule, to acquire a furniture placement plan corresponding to the to-be-decorated apartment layout image, where the furniture placement plan corresponding to an apartment layout of a user can be generated intelligently.

Figure 9:
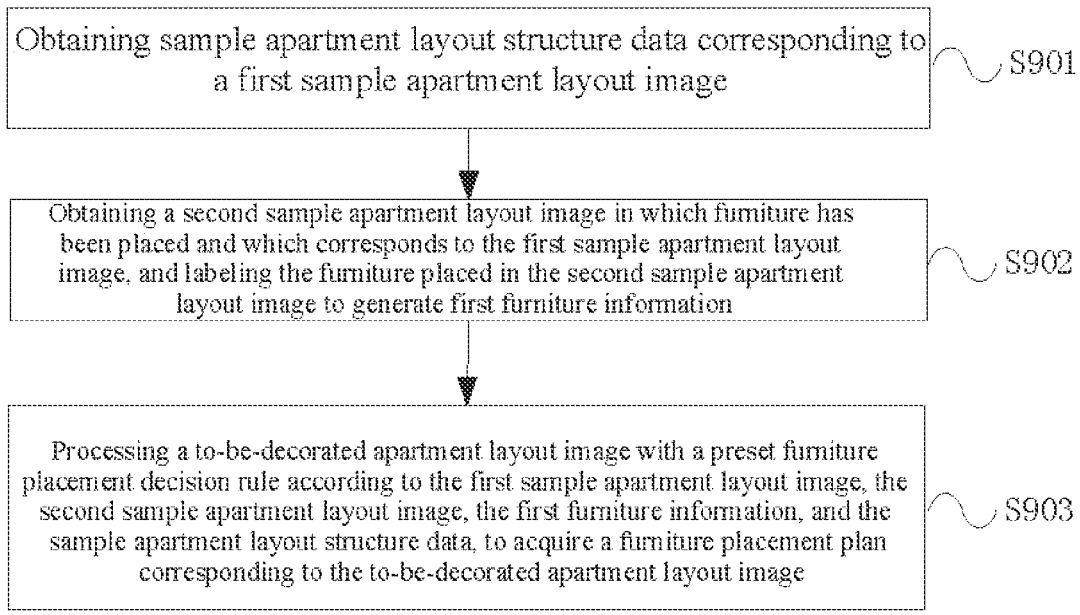
FIG. 9 is a flowchart of an embodiment of a method for generating a furniture placement plan based on an apartment layout in the present disclosure.

FIG. 9 is a flowchart of an embodiment of a method for generating a furniture placement plan based on an apartment layout in the present disclosure. The method shown in FIG. 9 includes the following steps: S901 to S903. The steps are described individually below.

S901, acquiring sample apartment layout structure data corresponding to a first sample apartment layout image.

The first sample apartment layout image can be a sample apartment layout image generated by means of a CAD modeling tool, or the like. The sample apartment layout image may be a vector diagram or the like. There are a plurality of apartment layout elements in the sample apartment layout image, and the sample apartment layout image is provided with apartment layout structure data. The sample apartment layout structure data corresponding to the first sample apartment layout image is acquired, the sample apartment layout structure data including: wall profile data, load-bearing wall profile data, door and window profile data, area data, story height data, and position coordinates data, etc., for the apartment layout.

S902, acquiring a second sample apartment layout image in which furniture has been placed and which corresponds to the first sample apartment layout image, and annotating the furniture placed in the second sample apartment layout image to generate first furniture information.

The second sample apartment layout image is a sample apartment layout image in which furniture has been placed and which corresponds to the first sample apartment layout image, and the furniture may be a table, a bed, an appliance, etc. The second sample apartment layout image may be annotated manually, where the first furniture information includes a furniture category, a placement position, an orientation, a style, a size, etc., or the second sample apartment layout image may be scored.

S903, processing a to-be-decorated apartment layout image with a preset furniture placement decision rule according to the first sample apartment layout image, the second sample apartment layout image, the first furniture information, and the sample apartment layout structure data, to acquire a furniture placement plan corresponding to the to-be-decorated apartment layout image.

There may be a plurality of methods for processing the to-be-decorated apartment layout image. For example, a training sample set is generated according to the first sample apartment layout image, the second sample apartment layout image, the first furniture information, and the sample apartment layout structure data. A neural network is trained according to training samples to obtain a neural network model. There may be a plurality of types of neural network models. The to-be-decorated apartment layout image is processed with the neural network model and the preset furniture placement decision rule, to acquire the furniture placement plan corresponding to the to-be-decorated apartment layout image.

The to-be-decorated apartment layout image may be a to-be-decorated apartment layout image provided by a user, and the to-be-decorated apartment layout image is processed with the trained neural network model and the preset furniture placement decision rule, to acquire the furniture placement plan corresponding to the to-be-decorated apartment layout image. There may be one or more furniture placement plans. The furniture placement plan includes a furniture placement image used to exhibit placement positions of furniture such as a table, a bed, and an appliance in the to-be-decorated apartment layout image, furniture exhibition information, etc.

Although an example in which the sample apartment layout structure data of the first sample apartment layout image is acquired and the first furniture information of the second sample apartment layout image is generated is used above for description, the present disclosure is not limited thereto. For example, sample apartment layout structure data of the first and second sample apartment layout images can be acquired, and first furniture information of the first and second sample apartment layout images are generated, so as to generate a training sample set according to the first sample apartment layout image, the second sample apartment layout image, the first furniture information, and the sample apartment layout structure data.

According to some implementations of the present disclosure, after acquiring the furniture placement plan corresponding to the to-be-decorated apartment layout image, corresponding three-dimensional models of the decorated apartments (i.e., three-dimensional space panoramic images) can be generated for the to-be-decorated apartment layout images according to the furniture placement plan.

According to some implementations of the present disclosure, the furniture placement decision rule can be a "core functions assigned to rooms" rule, for example, whether the dining table should be placed in the living room or the kitchen, and whether the washing machine should be placed in the bathroom or the balcony.

Figure 10:
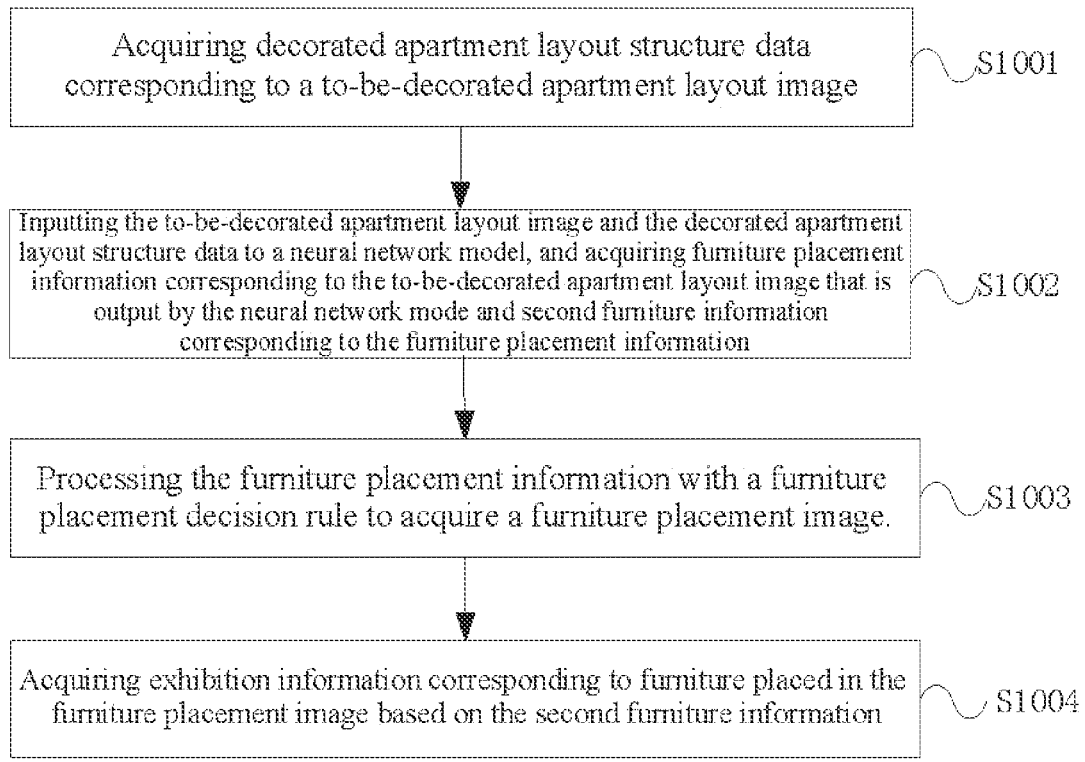
FIG. 10 is a flowchart of generating a furniture placement plan in an embodiment of a method for generating a furniture placement plan based on an apartment layout in the present disclosure.

FIG. 10 is a flowchart of an embodiment of a method for generating a furniture placement plan based on an apartment layout in the present disclosure. The method shown in FIG. 10 includes the following steps: S1001 to S1004. The steps are described individually below.

S1001, acquiring decorated apartment layout structure data corresponding to a to-be-decorated apartment layout image.

A user can input or select the to-be-decorated apartment layout image through a front-end page. The to-be-decorated apartment layout image input by the user may be an apartment layout image generated by means of a CAD modeling tool or the like. The to-be-decorated apartment layout image may be a vector diagram or the like, and thus the decorated apartment layout structure data can be acquired from the to-be-decorated apartment layout image.

If the to-be-decorated apartment layout image input by the user is not an apartment layout image generated by means of a CAD modeling tool, or the like. A sample apartment layout image corresponding to the to-be-decorated apartment layout image input by the user is found in stored sample apartment layout images, and the decorated apartment layout structure data is acquired from the sample apartment layout image. The decorated apartment layout structure data includes: wall profile data, load-bearing wall profile data, door and window profile data, area data, storey height data, and position coordinates data, etc., for the apartment layout.

S1002, inputting the to-be-decorated apartment layout image and the decorated apartment layout structure data to a neural network model, and acquiring furniture placement information corresponding to the to-be-decorated apartment layout image that is output by the neural network model and second furniture information corresponding to the furniture placement information. There may be a plurality of types of furniture placement information, and the second furniture information includes: a furniture category, a placement position, an orientation, a style, a size, etc.

S1003, processing the furniture placement information with a furniture placement decision rule to acquire a furniture placement image.

S1004, acquiring exhibition information corresponding to furniture placed in the furniture placement image based on the second furniture information. The exhibition information includes: a furniture category, a placement position, an orientation, a style, a size, etc., which is exhibition information of actually placed furniture that is selected from the furniture placement information with the furniture placement decision rule.

In one embodiment, the furniture placement information may be a furniture placement heat map output by the neural network model, or the like, and the furniture placement heat map includes: position information of furniture recommended to be placed in the to-be-decorated apartment layout image, a placement probability corresponding to the furniture recommended to be placed, etc. For example, the furniture placement heat map includes position information of furniture such as a bed and a table recommended to be placed in the to-be-decorated apartment layout image, a placement probability of the furniture such as a bed and a table recommended to be placed at the position, and/or exhibition information of the furniture such as a bed and a table recommended to be placed.

For example, an energy function corresponding to the furniture recommended to be placed may be acquired according to a furniture arrangement position relationship, and a constraint condition is established based on the energy function. The furniture placement heat map is traversed with Monte Carlo search tree algorithm, and the furniture placement image meeting the constraint condition is acquired, where the number of pieces of furniture placed in the furniture placement image is within a preset number interval.

For example, a placement position of the furniture recommended to be placed, relative to the wall and other furniture recommended to be placed, can be acquired, and an energy function E(x) is established based on the placement position. The furniture placement heat map is traversed with Monte Carlo search tree algorithm where min (ΣE(x)) is the constraint condition.

Monte Carlo tree searching is also referred to as a random sampling or statistical test method. Because being capable of truly simulating an actual physical process, Monte Carlo tree searching method, as a calculation method on the basis of a probability and statistics theory method, is a method for solving many calculation problems with random numbers. The problem to be solved is connected with a certain probability model to acquire an approximate solution to this problem. Monte Carlo search tree is traversed with Monte Carlo search algorithm, and a furniture recommended to be placed in the furniture placement heat map is selected as the actually placed furniture. That is, the actually placed furniture meeting the constraint condition is selected from the constructed Monte Carlo search tree, and at the same time an overall placement probability corresponding to all pieces of selected furniture that are actually placed is maximized, and the number of pieces of furniture placed in the furniture placement image is within the preset number interval. For example, the overall placement probability may be a sum, a weighted sum, etc., of placement probabilities of all pieces of actually placed furniture.

In one embodiment, the neural network model may be established with a plurality of algorithm models, for example, the neural network model is established by means of residual networks ResNet/DenseNet. The structure of residual neural network (ResNet) can rapidly accelerate the training of a neural network, and accuracy of the model is also greatly improved.

For example, the neural network model includes an input layer neuron model, an intermediate layer neuron model, and an output layer neuron model. The output of a neuron model in each layer is used as the input of a neuron model in the next layer. The neural network model can be a sub-network structure of a plurality of neural network layers with a fully connected structure, and the intermediate layer neuron model is a fully connected layer.

A training sample set is generated according to a first sample apartment layout image, a second sample apartment layout image, first furniture information, and sample apartment layout structure data, and the neural network is trained according to training samples, to obtain the neural network model. A depth algorithm model is trained with a large number of training samples, to acquire the trained neural network model.

The to-be-decorated apartment layout image and the decorated apartment layout structure data are input to the trained neural network model, and the furniture placement heat map is output by the neural network model, the furniture placement heat map including position information of furniture such as a bed and a table recommended to be placed in the to-be-decorated apartment layout image, a placement probability of the furniture such as a bed and a table recommended to be placed at the position, etc.

Figure 11:
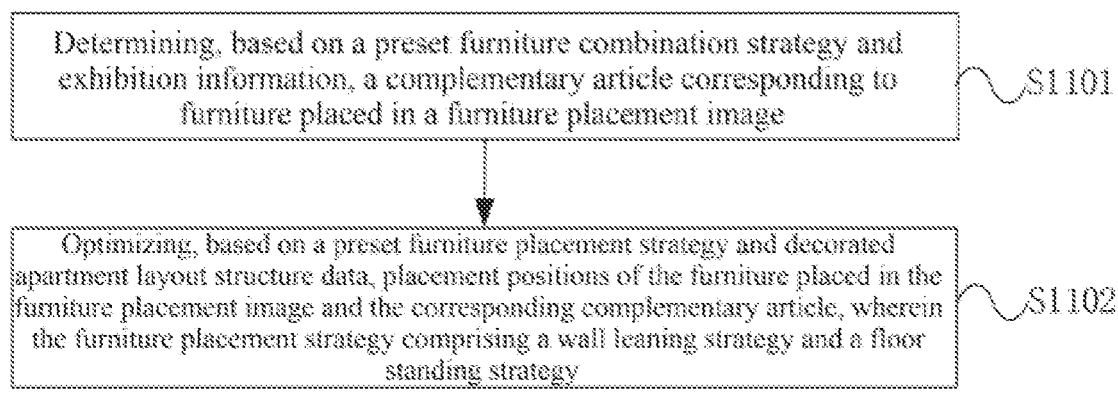
FIG. 11 is a flowchart of optimizing furniture placement in an embodiment of a method for generating a furniture placement plan based on an apartment layout in the present disclosure.

FIG. 11 is a flowchart of optimizing furniture placement in an embodiment of a method for generating a furniture placement plan based on an apartment layout in the present disclosure. The method shown in FIG. 11 includes the following steps: S1101 to S1102. The steps are described individually below.

S1101, determining, based on a preset furniture combination strategy and exhibition information, a complementary article corresponding to furniture placed in a furniture placement image.

The furniture combination strategy includes a furniture combination algorithm, or the like. The complementary article may be furniture, beddings, a decorative article, etc. For example, for a bed placed in the furniture placement image, a complementary article corresponding to the placed bed is determined as a bedside cabinet based on the furniture combination algorithm, and the style, the size, etc. of the bedside cabinet are determined based on exhibition information of the bed.

S1102, optimizing, based on a preset furniture placement strategy and decorated apartment layout structure data, placement positions of the furniture placed in the furniture placement image and the corresponding complementary article, the furniture placement strategy including: a wall leaning strategy, a floor standing strategy, etc.

The wall leaning strategy may be a wall leaning algorithm, and the floor standing strategy may be a floor standing algorithm. Placement positions of the furniture placed in the furniture placement image and the corresponding complementary article are optimized, based on the wall leaning strategy, the floor standing strategy, according to the decorated apartment layout structure data.

Figure 12:
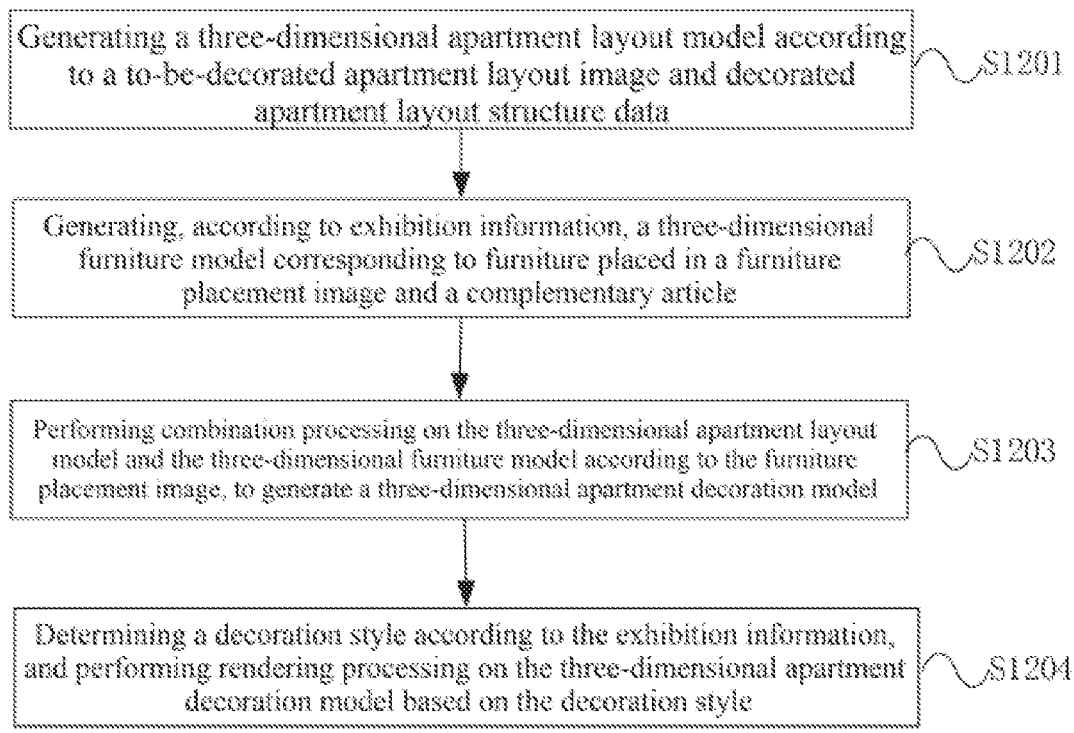
FIG. 12 is a flowchart of generating a three-dimensional rendering model in an embodiment of a method for generating a furniture placement plan based on an apartment layout in the present disclosure.

FIG. 12 is a flowchart of generating a three-dimensional rendering model in an embodiment of a method for generating a furniture placement plan based on an apartment layout in the present disclosure. The method shown in FIG. 12 includes the following steps: S1201 to S1204. The steps are described individually below.

S1201, generating a three-dimensional apartment layout model according to a to-be-decorated apartment layout image and decorated apartment layout structure data.

The three-dimensional apartment layout model may be generated according to the to-be-decorated apartment layout image and the decorated apartment layout structure data by means of a plurality of modeling tools such as a CAD modeling tool, etc.

S1202, generating, according to exhibition information, a three-dimensional furniture model corresponding to furniture placed in a furniture placement image and a complementary article.

The three-dimensional furniture model of the furniture placed in the furniture placement image and the complementary article can be generated according to the exhibition information by means of a plurality of modeling tools such as a CAD modeling tool, etc.

S1203, performing combination processing on the three-dimensional apartment layout model and the three-dimensional furniture model according to the furniture placement image, to generate a three-dimensional apartment decoration model. The three-dimensional furniture model is placed in a specified region in the three-dimensional apartment layout model according to the furniture placement image.

S1204, determining a decoration style according to the exhibition information, and performing rendering processing on the three-dimensional apartment decoration model based on the decoration style. Therefore, a three-dimensional model of a decorated apartment is generated.

Filling and rendering effects of furniture placement, wall and floor pavement, door and window under different decoration styles can be realized, which can be displayed to a user through a front-end page. A furniture placement plan corresponding to the to-be-decorated apartment layout image is acquired, and a rendered three-dimensional virtual space panoramic image corresponding to the furniture placement plan is generated. The user can wander in the rendered three-dimensional virtual space panoramic image presented at the front-end and browse the apartment design plan in an all-round way. Finally, a browse of a decoration plan based on a user's own apartment layout is realized.

Figure 13A:
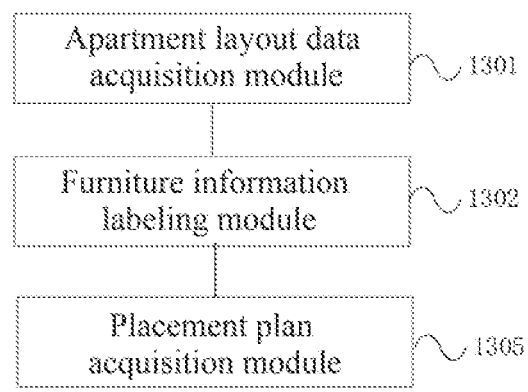
FIG. 13A is a schematic structural diagram of an embodiment of an apparatus for generating a furniture placement plan based on an apartment layout in the present disclosure.

In one embodiment, as shown in FIG. 13A, the present disclosure provides an apparatus for generating a furniture placement plan based on an apartment layout, the apparatus including: an apartment layout data acquisition module 1301, a furniture information annotating module 1302, and a placement plan acquisition module 1305. The apartment layout data acquisition module 1301 acquires sample apartment layout structure data corresponding to a first sample apartment layout image. The furniture information annotating module 1302 acquires a second sample apartment layout image in which furniture has been placed and which corresponds to the first sample apartment layout image, and annotates the furniture placed in the second sample apartment layout image to generate first furniture information. The placement plan acquisition module 1305 processes a to-be-decorated apartment layout image with a preset furniture placement decision rule according to the first sample apartment layout image, the second sample apartment layout image, the first furniture information, and the sample apartment layout structure data, to acquire a furniture placement plan corresponding to the to-be-decorated apartment layout image.

Figure 13B:
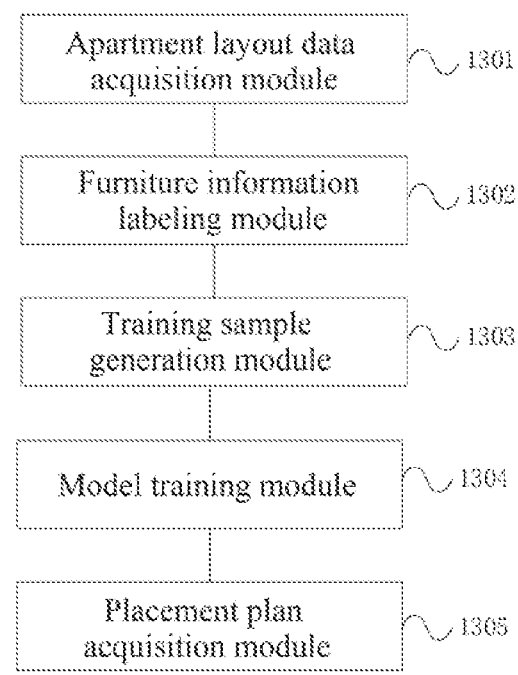
FIG. 13B is a schematic structural diagram of another embodiment of an apparatus for generating a furniture placement plan based on an apartment layout in the present disclosure.

In one embodiment, as shown in FIG. 13B, the apparatus for generating a furniture placement plan based on an apartment layout further includes: a training sample generation module 1303 and a model training module 1304. The training sample generation module 1303 generates a training sample set according to the first sample apartment layout image, the second sample apartment layout image, the first furniture information, and the sample apartment layout structure data. The model training module 1304 trains a neural network according to training samples, to obtain a neural network model. The placement plan acquisition module 1305 processes the to-be-decorated apartment layout image with the neural network model and the preset furniture placement decision rule, to acquire the furniture placement plan corresponding to the to-be-decorated apartment layout image.

In one embodiment, the apartment layout data acquisition module 1301 acquires decorated apartment layout structure data corresponding to the to-be-decorated apartment layout image. The placement plan acquisition module 1305 inputs the to-be-decorated apartment layout image and the decorated apartment layout structure data to the neural network model, to acquire furniture placement information corresponding to the to-be-decorated apartment layout image that is output by the neural network model and second furniture information corresponding to the furniture placement information. The placement plan acquisition module 1305 processes the furniture placement information with the furniture placement decision rule to acquire a furniture placement image to acquire, based on the second furniture information, exhibition information corresponding to the furniture placed in the furniture placement image.

The furniture placement information includes a furniture placement heat map, where the furniture placement heat map includes: position information of furniture recommended to be placed in the to-be-decorated apartment layout image, and a placement probability corresponding to the furniture recommended to be placed. The placement plan acquisition module 1305 acquires, according to a furniture arrangement position relationship, an energy function corresponding to the furniture recommended to be placed, and establishes a constraint condition based on the energy function. The placement plan acquisition module 1305 traverses the furniture placement heat map with Monte Carlo search tree algorithm, to acquire the furniture placement image meeting the constraint condition, where the number of pieces of furniture placed in the furniture placement image is within a preset number interval.

Figure 14:
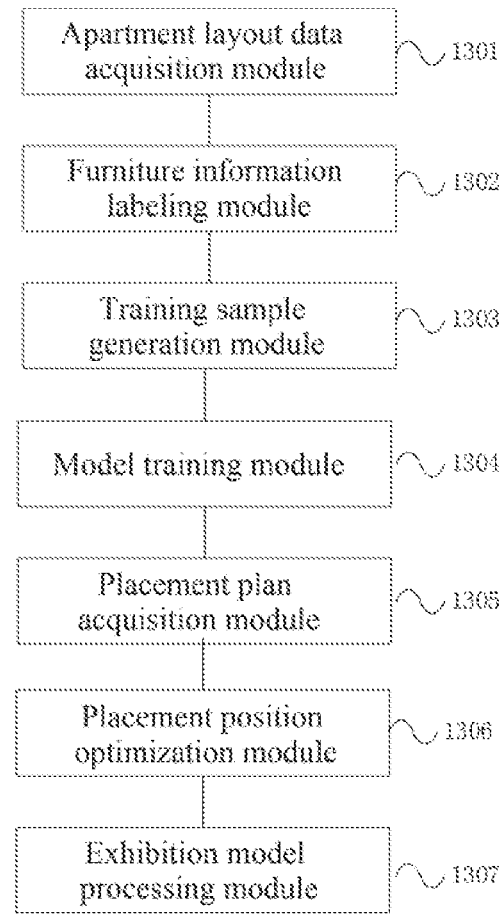
FIG. 14 is a schematic structural diagram of still another embodiment of an apparatus for generating a furniture placement plan based on an apartment layout in the present disclosure.

In one embodiment, as shown in FIG. 14, a placement position optimization module 1306 determines, based on a preset furniture combination strategy and the exhibition information, a complementary article corresponding to the furniture placed in the furniture placement image. The placement position optimization module 1306 optimizes, based on a preset furniture placement strategy and according to the decorated apartment layout structure data, placement positions of the furniture placed in the furniture placement image and the corresponding complementary article, the furniture placement strategy including: a wall leaning strategy, a floor standing strategy, etc.

An exhibition model processing module 1307 generates a three-dimensional apartment layout model according to the to-be-decorated apartment layout image and the decorated apartment layout structure data, and generates, according to the exhibition information, a three-dimensional furniture model corresponding to the furniture placed in the furniture placement image and the complementary article. The exhibition model processing module 1307 performs combination processing on the three-dimensional apartment layout model and the three-dimensional furniture model according to the furniture placement image to generate a three-dimensional apartment decoration model, determines a decoration style according to the exhibition information, and performs rendering processing on the three-dimensional apartment decoration model based on the decoration style.

According to the method, apparatus, electronic device, and storage medium for generating a furniture placement plan based on an apartment layout in the embodiments described above, a training sample set is generated according to a first sample apartment layout image, a second sample apartment layout image, first furniture information, and sample apartment layout structure data, and a neural network is trained, to obtain a neural network model; a to-be-decorated apartment layout image is processed with the neural network model and a preset furniture placement decision rule, to acquire a furniture placement plan corresponding to the to-be-decorated apartment layout image; the furniture placement plan corresponding to an apartment layout of a user can be intelligently generated, and a three-dimensional decoration effect image corresponding to the apartment layout of the user can be generated, so that the user can browse an apartment decoration plan in an all-round way, and designer resources and a design process time can be saved, which can help the user quickly and conveniently select suitable furniture and a decoration plan, simplify the process of decoration design, provide convenience for the user to make a decoration decision, and reduce the cost of decoration.

Figure 15:
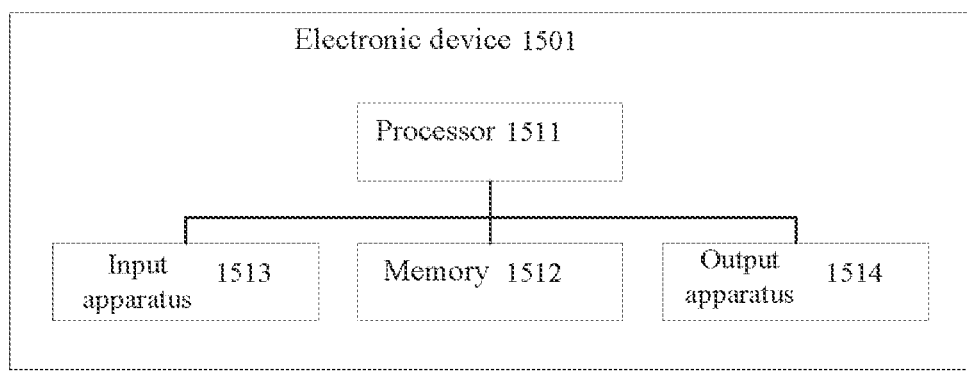
FIG. 15 is a schematic structural diagram of an electronic device provided in an embodiment of the present disclosure.

FIG. 15 is a structural diagram of an embodiment of an electronic device (i.e., a computing apparatus) of the present disclosure. As shown in FIG. 15, the electronic device 1501 includes one or more processors 1511 and memories 1512.

The processor 1511 may be a central processing unit (CPU) or other forms of processing units having data processing capabilities and/or instruction execution capabilities, and may control other components in the electronic device 1501 to perform desired functions.

The memory 1512 may include one or more computer program products, and the computer program product may include various forms of computer-readable storage media, such as a volatile memory and/or a non-volatile memory. The volatile memory for example may include: a random access memory (RAM) and/or a cache, etc. The non-volatile memory for example may include: a read-only memory (ROM), a hard disk, a flash memory, etc. One or more computer program instructions may be stored on the computer-readable storage medium, and the processor 1511 can execute the program instructions to implement the method for generating a furniture placement plan based on an apartment layout and/or other desired functions in various embodiments above of the present disclosure. Various contents such as input signals, signal components, and noise components can also be stored in the computer-readable storage medium.

In one example, the electronic device 1501 may further include: an input apparatus 1513, an output apparatus 1514, etc. The components are interconnected by means of a bus system and/or other forms of connecting mechanisms (not shown). In addition, the input apparatus 1513 may further include a keyboard, a mouse, etc. The output apparatus 1514 may output various types of information to the outside. The output apparatus 1514 may include, for example, a display, a speaker, a printer, a communication network, and a remote output device connected thereto, etc.

Certainly, for simplicity, only some of the components of the electronic device 1501 that are related to the present disclosure are shown in FIG. 15, and components such as buses, and input/output interfaces are omitted. In addition, depending on a specific application scenario, the electronic device 1501 may further include any other suitable component.

In addition to the method and device described above, the embodiments of the present disclosure may also be a computer program product which includes computer program instructions that, when executed by a processor, enable the processor to perform steps, described in the "exemplary methods" of this specification, in a method for generating a furniture placement plan based on an apartment layout according to various embodiments of the present disclosure.

The computer program product can be obtained by writing, in any combination of one or more programming languages, program codes for performing operations of the embodiments of the present disclosure, where the programming languages include an object oriented programming language, such as Java, C++, or the like, and further include conventional procedural programming languages, such as "C" language or similar programming languages. The program code may be completely executed on a computing device of a user, partially executed on a user device, executed as a separate software package, partially executed on a computing device of a user and partially executed on a remote computing device, or completely executed on a remote computing device or server.

In addition, the embodiments of the present disclosure may also be a computer-readable storage medium which stores computer program instructions that, when executed by a processor, enable the processor to perform steps, described in the "exemplary methods" of this specification, in a method for generating a furniture placement plan based on an apartment layout according to various embodiments of the present disclosure.

The computer-readable storage medium may be any combination of one or more readable media. The readable medium may be a readable signal medium or a readable storage medium. An example of the readable storage medium may include, but is not limited to electric, magnetic, optical, electromagnetic, infrared, or semiconductor systems, apparatuses or devices, or any combination of the above. A more specific example (a non-exhaustive list) of the readable storage medium may include: an electrical connection with one or more wires, a portable disk, a hard disk, a random access memory (RAM), a read-only memory (ROM), an erasable programmable read-only memory (EPROM or flash memory), a fiber, a portable compact disk read-only memory (CD-ROM), an optical memory, a magnetic memory, or any suitable combination of the above.

The aspects of the present disclosure may be understood from the following enumerated exemplary embodiments (EEE):

EEE 1. A method for displaying three-dimensional models of an apartment before and after decoration on the same screen, comprising:

acquiring, by a user terminal, field-of-view change information of a user during roaming and/or glancing in a current three-dimensional virtual space, wherein the field-of-view change information comprises point position change information and/or line-of-sight direction change information;

adjusting a display field of view of a second three-dimensional model of the apartment according to the field-of-view change information if the current three-dimensional virtual space corresponds to a first three-dimensional model of the apartment, such that the first three-dimensional model of the apartment and the second three-dimensional model of the apartment are displayed on the same screen at the same field of view; and adjusting a display field of view of the first three-dimensional model of the apartment according to the field-of-view change information if the current three-dimensional virtual space corresponds to the second three-dimensional model of the apartment, such that the first three-dimensional model of the apartment and the second three-dimensional model of the apartment are displayed on the same screen at the same field of view, wherein the first apartment model and the second apartment model have been displayed on the same screen at the same field of view before the field of view of the user changes, and the first three-dimensional model of the apartment is a three-dimensional model of a current apartment, and the second three-dimensional model of the apartment is a three-dimensional model of a decorated apartment obtained after a recommended decoration effect is loaded.

EEE 2. The method for displaying three-dimensional models of an apartment before and after decoration on the same screen according to EEE1, wherein acquiring field-of-view change information of a user during roaming and/or glancing in a current three-dimensional virtual space specifically comprises: acquiring, through a child page of a three-dimensional model of the apartment that corresponds to the current three-dimensional virtual space, the field-of-view change information of the user during roaming and/or glancing in the current three-dimensional virtual space;

adjusting a display field of view of a second three-dimensional model of the apartment according to the field-of-view change information if the current three-dimensional virtual space corresponds to a first three-dimensional model of the apartment specifically comprises: reporting, through a child page of the first three-dimensional model of the apartment, the field-of-view change information to a parent page, the parent page then delivering the field-of-view change information to a child page of the second three-dimensional model of the apartment, wherein the child page of the second three-dimensional model of the apartment adjusts the display field of view of the second three-dimensional model of the apartment according to the field-of-view change information;

adjusting a display field of view of the first three-dimensional model of the apartment according to the field-of-view change information if the current three-dimensional virtual space corresponds to the second three-dimensional model of the apartment specifically comprises: reporting, through the child page of the second three-dimensional model of the apartment, the field-of-view change information to the parent page, the parent page then delivering the field-of-view change information to the child page of the first three-dimensional model of the apartment, wherein the child page of the first three-dimensional model of the apartment adjusts the display field of view of the first three-dimensional model of the apartment according to the field-of-view change information.

EEE 3. The method for displaying three-dimensional models of an apartment before and after decoration on the same screen according to EEE1, wherein before acquiring field-of-view change information of a user during roaming and/or glancing in a current three-dimensional virtual space, the method further comprises:

displaying the first three-dimensional model of the apartment, acquiring field-of-view information of the first three-dimensional model of the apartment, acquiring the second three-dimensional model of the apartment from a back-end server, and displaying the second three-dimensional model of the apartment according to the field-of-view information of the first three-dimensional model of the apartment, such that the first three-dimensional model of the apartment and the second three-dimensional model of the apartment are displayed on the same screen at the same field of view; or displaying the second three-dimensional model of the apartment, acquiring field-of-view information of the second three-dimensional model of the apartment, acquiring the first three-dimensional model of the apartment from the back-end server, and displaying the first three-dimensional model of the apartment according to the field-of-view information of the second three-dimensional model of the apartment, such that the first three-dimensional model of the apartment and the second three-dimensional model of the apartment are displayed on the same screen at the same field of view, wherein the field-of-view information comprises point position information and line-of-sight direction information.

EEE 4. The method for displaying three-dimensional models of an apartment before and after decoration on the same screen according to EEE3, wherein before acquiring field-of-view information of the first three-dimensional model of the apartment, the method further comprises: determining whether preset triggering information is received, and if it is determined that the preset triggering information is received, performing the action of acquiring field-of-view information of the first three-dimensional model of the apartment; and before acquiring field-of-view change information of the second three-dimensional model of the apartment, the method further comprises: determining whether the preset triggering information is received, and if it is determined that the preset triggering information is received, performing the action of acquiring field-of-view information of the second three-dimensional model of the apartment.

EEE 5. The method for displaying three-dimensional models of an apartment before and after decoration on the same screen according to EEE 3, wherein the method further comprises: acquiring, by a back-end server, preset apartment information according to the first three-dimensional model of the apartment, wherein the preset apartment information comprises apartment layout information, story height information and point position information;

generating, according to the preset apartment information, a three-dimensional model of a vacant apartment that corresponds to the first three-dimensional model of the apartment;

adding a three-dimensional model of furniture and appliances to the three-dimensional model of the vacant apartment to generate the second three-dimensional model of the apartment; and storing the first three-dimensional model of the apartment and the second three-dimensional model of the apartment correspondingly.

EEE 6. The method for displaying three-dimensional models of an apartment before and after decoration on the same screen according to EEE5, wherein adding a three-dimensional model of furniture and appliances to the three-dimensional model of the vacant apartment specifically comprises:
  automatically adding the corresponding three-dimensional model of the furniture and appliances to the three-dimensional model of the vacant apartment, wherein the three-dimensional model of the furniture and appliances is a three-dimensional model generated in advance.

EEE 7. An apparatus for displaying three-dimensional models of an apartment before and after decoration on the same screen, comprising:
  an field-of-view change information acquisition module configured to: acquire field-of-view change information of a user during roaming and/or glancing in a current three-dimensional virtual space;
  a first display module configured to: adjust a display field of view of a second three-dimensional model of the apartment according to the field-of-view change information if the current three-dimensional virtual space corresponds to a first three-dimensional model of the apartment, such that the first three-dimensional model of the apartment and the second three-dimensional model of the apartment are displayed on the same screen at the same field of view; and
  a second display module configured to: adjust a display field of view of the first three-dimensional model of the apartment according to the field-of-view change information if the current three-dimensional virtual space corresponds to the second three-dimensional model of the apartment, such that the first three-dimensional model of the apartment and the second three-dimensional model of the apartment are displayed on the same screen at the same field of view, wherein the first apartment model and the second apartment model have been displayed on the same screen at the same field of view before the field of view of the user changes, and the first three-dimensional model of the apartment is a three-dimensional model of a current apartment, and the second three-dimensional model of the apartment is a three-dimensional model of a decorated apartment obtained after a recommended decoration effect is loaded.

EEE 8. A system for displaying three-dimensional models of an apartment before and after decoration on the same screen, comprising an apparatus for displaying three-dimensional models of an apartment before and after decoration on the same screen at the same field of view according to EEE 7 and a back-end server according to any of EEEs 5 to 6.

EEE 9. An electronic device, comprising a memory, a processor, and a computer program stored on the memory and executable at the processor, wherein when the processor executes the program, steps of a method for displaying three-dimensional models of an apartment before and after decoration on the same screen at the same field of view according to any of EEEs 1 to 4 are implemented.

EEE 10. A non-transitory computer-readable storage medium, having a computer program stored thereon, wherein when the computer program is executed by a processor, steps of a method for displaying three-dimensional models of an apartment before and after decoration on the same screen at the same field of view according to any of EEEs 1 to 4 are implemented.

According to the method, apparatus, and system for displaying three-dimensional models of an apartment before and after decoration on the same screen provided in embodiments of the present disclosure, a display field of view of a three-dimensional model of the apartment after decoration is adjusted according to field-of-view change information of a user during roaming and/or glancing in a three-dimensional virtual space of a three-dimensional model of the apartment before decoration, or a display field of view of the three-dimensional model of the apartment before decoration is adjusted according to field-of-view change information of the user during roaming and/or glancing in a three-dimensional virtual space of the three-dimensional model of the apartment after decoration, such that the three-dimensional model of the apartment before decoration and the three-dimensional model of the apartment after decoration are linked to the same screen at the same field of view, and the user visually observes the difference between the two three-dimensional models of the apartment before and after decoration, thus providing the user with a real feeling of decoration effect exhibition.

EEE 11. A method for generating a furniture placement plan based on an apartment layout, comprising:
  acquiring sample apartment layout structure data corresponding to a first sample apartment layout image;
  acquiring a second sample apartment layout image in which furniture has been placed and which corresponds to the first sample apartment layout image, and annotating the furniture placed in the second sample apartment layout image to generate first furniture information; and
  processing a to-be-decorated apartment layout image with a preset furniture placement decision rule according to the first sample apartment layout image, the second sample apartment layout image, the first furniture information, and the sample apartment layout structure data, to acquire a furniture placement plan corresponding to the to-be-decorated apartment layout image.

EEE 12. The method according to EEE 11, wherein said processing a to-be-decorated apartment layout image to acquire a furniture placement plan corresponding to the to-be-decorated apartment layout image comprises:
  generating a training sample set according to the first sample apartment layout image, the second sample apartment layout image, the first furniture information, and the sample apartment layout structure data;
  training a neural network according to the training sample set, to obtain a neural network model; and
  processing the to-be-decorated apartment layout image with the neural network model and the preset furniture placement decision rule, to acquire the furniture placement plan corresponding to the to-be-decorated apartment layout image.

EEE 13. The method according to EEE12, wherein said processing the to-be-decorated apartment layout image with the neural network model and the preset furniture placement decision rule, to acquire the furniture placement plan corresponding to the to-be-decorated apartment layout image comprises:
  acquiring decorated apartment layout structure data corresponding to the to-be-decorated apartment layout image;
  inputting the to-be-decorated apartment layout image and the decorated apartment layout structure data to the neural network model, acquiring furniture placement information corresponding to the to-be-decorated apartment layout image that is output by the neural network model and second furniture information corresponding to the furniture placement information;
  processing the furniture placement information with the furniture placement decision rule to acquire a furniture placement image; and acquiring exhibition information corresponding to furniture placed in the furniture placement image based on the second furniture information.

EEE 14. The method according to EEE 13, wherein
the neural network model comprises: an input layer neuron model, an intermediate layer neuron model, and an output layer neuron model; the output of a neuron model in each layer is used as the input of a neuron model in the next layer;
the neural network model is a sub-network structure of a plurality of neural network layers with a fully connected structure; and the intermediate layer neuron model is a fully connected layer.

EEE 15. The method according to EEE 13, wherein
the furniture placement information comprises: a furniture placement heat map;
wherein the furniture placement heat map comprises: position information of furniture recommended to be placed in the to-be-decorated apartment layout image, and a placement probability corresponding to the furniture recommended to be placed.

EEE 16. The method according to EEE 15, wherein said processing the furniture placement information with the furniture placement decision rule to acquire a furniture placement image comprises:
acquiring, according to a furniture arrangement position relationship, an energy function corresponding to the furniture recommended to be placed;
establishing a constraint condition based on the energy function;
traversing the furniture placement heat map with Monte Carlo search tree algorithm, to acquire the furniture placement image meeting the constraint condition, wherein the number of pieces of furniture placed in the furniture placement image is within a preset number interval.

EEE 17. The method according to EEE 16, further comprising:
determining, based on a preset furniture combination strategy and the exhibition information, a complementary article corresponding to the furniture placed in the furniture placement image;
optimizing, based on a preset furniture placement strategy and the decorated apartment layout structure data, placement positions of the furniture placed in the furniture placement image and the corresponding complementary article,
wherein the furniture placement strategy comprises: one or more of a wall leaning strategy and a floor standing strategy.

EEE 18. An apparatus for generating a furniture placement plan based on an apartment layout, comprising:
an apartment layout data acquisition module configured to acquire sample apartment layout structure data corresponding to a first sample apartment layout image;
a furniture information annotating module configured to acquire a second sample apartment layout image in which furniture has been placed and which corresponds to the first sample apartment layout image, and annotate the furniture placed in the second sample apartment layout image to generate first furniture information;
a placement plan acquisition module configured to process a to-be-decorated apartment layout image with a preset furniture placement decision rule according to the first sample apartment layout image, the second sample apartment layout image, the first furniture information, and the sample apartment layout structure data, to acquire a furniture placement plan corresponding to the to-be-decorated apartment layout image.

EEE 19. A computer-readable storage medium, storing a computer program which is configured to implement the method according to any of EEEs 11 to 17.

EEE 20. An electronic device, comprising:
a processor; and a memory configured to store instructions executable by the processor;
the processor being configured to read the executable instructions from the memory, and execute the instructions to implement the method according to any of EEEs 11 to 17.

According to the method, apparatus, electronic device, and storage medium for generating a furniture placement plan based on an apartment layout provided in the embodiments of the present disclosure, a furniture placement plan corresponding to an apartment layout of a user can be intelligently generated, which can help the user quickly and conveniently select suitable furniture and a decoration plan, simplify the process of decoration design, and provide convenience for the user to make a decoration decision.

The basic principles of the present disclosure are described above in conjunction with specific embodiments. However, it should be noted that the advantages, superiorities, effects, etc., mentioned in the present disclosure are only examples and not limitations, and these advantages, superiorities, effects, etc. cannot be considered as necessities for various embodiments of the present disclosure. In addition, the specific details disclosed above are only examples and for ease of understanding, rather than limitations, and the details described above do not limit the present disclosure to use the specific details described above for implementation.

The embodiments in this specification are described in a progressive manner. Each embodiment focuses on the differences from other embodiments, and for the same or similar parts among the various embodiments, reference can be made to each other. The system embodiment basically corresponds to the method embodiment and therefore is described in a relatively simple manner, and for related parts, reference can be made to part of the description of the method embodiment.

The block diagrams of devices, apparatuses, equipment, and systems involved in the present disclosure are merely illustrative examples and are not intended to require or imply that connection, arrangement, and configuration must be implemented in the manner shown in the block diagrams. Those skilled in the art will recognize that these devices, apparatuses, equipment, and systems may be connected, arranged, and configured in any manner. The words such as "include", "contain", and "have" are open words, which refer to "including but not limited to" with which the words can be used interchangeably. The words "or" and "and" used herein refer to the word "and/or" with which the words can be used interchangeably unless the context clearly indicates otherwise. The word "such as" used herein refers to the phrase "such as but not limited to" with which the word can be used interchangeably.

The method and apparatus of the present disclosure may be implemented in many ways. For example, the method and apparatus of the present disclosure may be implemented by means of software, hardware, firmware, or any combination of software, hardware and firmware. The above sequence of steps for the method is merely for illustration, and the steps of the method of the present disclosure are not limited to the sequence specifically described above unless otherwise specifically stated. In addition, in some embodiments, the present disclosure may also be implemented as programs recorded in a recording medium, the programs comprising machine-readable instructions for implementing the method according to the present disclosure. Therefore, the present disclosure also covers the recording medium storing the programs for implementation of the method according to the present disclosure.

It should also be noted that, in the apparatus, device and method of the present disclosure, various components or various steps can be decomposed and/or recombined. These decompositions and/or recombination should be regarded as equivalent solutions of the present disclosure.

The above description about the disclosed aspects is provided to enable any person skilled in the art to make or use the present disclosure. Various modifications to these aspects are obvious to those skilled in the art, and the general principles defined herein can be applied to other aspects without departing from the scope of the present disclosure. Therefore, the present disclosure is not intended to be limited to the aspects shown herein, but in accordance with the widest scope consistent with the principles and novel features disclosed herein.

The above description has been given for the purpose of illustration and description. Moreover, this description is not intended to limit the embodiments of the present disclosure to the form disclosed herein. Although various example aspects and embodiments have been discussed above, those skilled in the art will conceive certain variations, modifications, changes, additions, and sub-combinations thereof

What is claimed is:

1. A method for displaying three-dimensional space views on an electronic device, the three-dimensional space views at least comprising a first three-dimensional space view and a second three-dimensional space view, the method comprising:
   presenting the first three-dimensional space view on a first user interface of the electronic device;
   presenting the second three-dimensional space view on a second user interface of the electronic device;
   receiving a user input at the first user interface to generate a view change instruction comprising field-of-view change information according to the user input;
   changing, according to the view change instruction, the first three-dimensional space view presented on the first user interface;
   sending the view change instruction comprising the field-of-view change information from the first user interface to the second user interface; and
   changing, according to the view change instruction comprising the field-of-view change information that is received from the first user interface, the second three-dimensional space view presented on the second user interface,
   wherein the method is used for displaying three-dimensional models of an apartment before and after decoration on a same screen, and
   wherein the first three-dimensional space view corresponds to a first three-dimensional model of the apartment, and the second three-dimensional space view corresponds to a second three-dimensional model of the apartment,
   the method further comprising:
   loading, by the first user interface according to the view change instruction, data used for updating the first three-dimensional space view;
   loading, by the second user interface according to the view change instruction, data used for updating the second three-dimensional space view; and
   performing a synchronization on the first user interface and the second user interface to update the first three-dimensional space view and the second three-dimensional space view at the same time,
   wherein the synchronization includes: the first user interface notifying the second user interface that the first user interface has completed data loading, and the second user interface notifying the first user interface that the second user interface has completed data loading.

2. The method according to claim 1, wherein the method further comprises:
   adjusting a display field of view of the second three-dimensional model of the apartment according to the field-of-view change information, such that the first three-dimensional model of the apartment and the second three-dimensional model of the apartment are displayed on the same screen at a same field of view.

3. The method according to claim 2,
   wherein the first user interface is a child page of the first three-dimensional model of the apartment that corresponds to the first three-dimensional space view, and
   wherein the method further comprises:
   acquiring, through the child page of the first three-dimensional model of the apartment that corresponds to the first three-dimensional space view, the field-of-view change information of a user during roaming and/or glancing in the first three-dimensional space view.

4. The method according to claim 3,
   wherein the second user interface is a child page of the second three-dimensional model of the apartment that corresponds to the second three-dimensional space view, and
   wherein adjusting the display field of view of the second three-dimensional model of the apartment according to the field-of-view change information comprises:
   sending, through the child page of the first three-dimensional model of the apartment, the field-of-view change information to the child page of the second three-dimensional model of the apartment; and
   adjusting, by the child page of the second three-dimensional model of the apartment, the display field of view of the second three-dimensional model of the apartment according to the field-of-view change information.

5. The method according to claim 2,
   wherein presenting the first three-dimensional space view on the first user interface comprises:
   displaying the first three-dimensional model of the apartment, and
   wherein presenting the second three-dimensional space view on the second user interface comprises:
   acquiring field-of-view information of the first three-dimensional model of the apartment;
   acquiring the second three-dimensional model of the apartment; and
   displaying the second three-dimensional model of the apartment according to the field-of-view information of the first three-dimensional model of the apartment, such that the first three-dimensional model of the apartment and the second three-dimensional model of the apartment are displayed on the same screen at the same field of view.

6. The method according to claim 5, further comprising:
determining whether preset triggering information is received, and in response to determining that the preset triggering information is received, performing the acquiring of the field-of-view information of the first three-dimensional model of the apartment.

7. The method according to claim 2, further comprising:
acquiring preset apartment information according to the first three-dimensional model of the apartment, wherein the preset apartment information comprises apartment layout information, story height information and point position information;
generating, according to the preset apartment information, a three-dimensional model of a vacant apartment that corresponds to the first three-dimensional model of the apartment;
adding three-dimensional models of furniture and appliances to the three-dimensional model of the vacant apartment to generate the second three-dimensional model of the apartment; and
storing the first three-dimensional model of the apartment and the second three-dimensional model of the apartment correspondingly.

8. The method according to claim 2,
wherein at least one of the first three-dimensional model of the apartment and the second three-dimensional model of the apartment is a three-dimensional model of a decorated apartment, and
wherein the method further comprises:
acquiring sample apartment layout structure data and furniture information corresponding to a plurality of sample apartment layout images;
processing a specified apartment layout image according to the plurality of sample apartment layout images, the furniture information, and the sample apartment layout structure data, to generate a furniture placement plan for the specified apartment layout image; and
generating the three-dimensional model of the decorated apartment for the specified apartment layout image according to the furniture placement plan.

9. The method according to claim 8,
wherein generating the furniture placement plan for the specified apartment layout image comprises: generating first and second furniture placement plans for the specified apartment layout image, and
wherein generating the three-dimensional model of the decorated apartment for the specified apartment layout image according to the furniture placement plan comprises:
generating the first three-dimensional model of the apartment and the second three-dimensional model of the apartment for the specified apartment layout image according to the first and second furniture placement plans.

10. The method according to claim 2,
wherein the second three-dimensional model of the apartment is a three-dimensional model of a decorated apartment, and
wherein the method further comprises:
acquiring sample apartment layout structure data corresponding to a first sample apartment layout image;
acquiring a second sample apartment layout image in which furniture has been placed and which corresponds to the first sample apartment layout image, and annotating the furniture placed in the second sample apartment layout image to generate first furniture information;
processing a to-be-decorated apartment layout image with a preset furniture placement decision rule according to the first sample apartment layout image, the second sample apartment layout image, the first furniture information, and the sample apartment layout structure data, to acquire a furniture placement plan corresponding to the to-be-decorated apartment layout image; and
generating the three-dimensional model of the decorated apartment according to the furniture placement plan.

11. The method according to claim 10, wherein processing the to-be-decorated apartment layout image to acquire the furniture placement plan corresponding to the to-be-decorated apartment layout image comprises:
generating a training sample set according to the first sample apartment layout image, the second sample apartment layout image, the first furniture information, and the sample apartment layout structure data;
training a neural network according to the training sample set, to obtain a neural network model; and
processing the to-be-decorated apartment layout image with the neural network model and the preset furniture placement decision rule, to acquire the furniture placement plan corresponding to the to-be-decorated apartment layout image.

12. The method according to claim 11, wherein processing the to-be-decorated apartment layout image with the neural network model and the preset furniture placement decision rule, to acquire the furniture placement plan corresponding to the to-be-decorated apartment layout image comprises:
acquiring decorated apartment layout structure data corresponding to the to-be-decorated apartment layout image;
inputting the to-be-decorated apartment layout image and the decorated apartment layout structure data to the neural network model, to acquire furniture placement information, corresponding to the to-be-decorated apartment layout image, output by the neural network model and second furniture information corresponding to the furniture placement information;
processing the furniture placement information with the furniture placement decision rule to acquire a furniture placement image; and
acquiring exhibition information corresponding to furniture placed in the furniture placement image based on the second furniture information.

13. The method according to claim 12,
wherein the furniture placement information comprises a furniture placement heat map, and
wherein the furniture placement heat map comprises position information of furniture recommended to be placed in the to-be-decorated apartment layout image, and a placement probability corresponding to the furniture recommended to be placed.

14. The method according to claim 13, wherein processing the furniture placement information with the furniture placement decision rule to acquire the furniture placement image comprises:
acquiring, according to a furniture placement position relationship, an energy function corresponding to the furniture recommended to be placed;
establishing a constraint condition based on the energy function; and
traversing the furniture placement heat map with Monte Carlo search tree algorithm, to acquire the furniture placement image meeting the constraint condition, wherein the number of pieces of furniture placed in the furniture placement image is within a preset number interval.

15. The method according to claim 14, further comprising:
    determining, based on a preset furniture combination strategy and the exhibition information, a complementary article corresponding to the furniture placed in the furniture placement image; and
    optimizing, based on a preset furniture placement strategy and the decorated apartment layout structure data, placement positions of the furniture in the furniture placement image and the corresponding complementary article,
    wherein the furniture placement strategy comprises one or more of a wall leaning strategy and a floor standing strategy.

16. The method according to claim 1,
    wherein the user input is a first user input, and
    wherein the method further comprises:
    changing the second three-dimensional space view according to a second user input; and
    changing the first three-dimensional space view according to a change in the second three-dimensional space view.

17. The method according to claim 1,
    wherein the view change instruction further comprises position change information of the first three-dimensional space view,
    wherein presenting the second three-dimensional space view on the second user interface comprises presenting the second three-dimensional space view on the second user interface according to a first position,
    wherein the method further comprises: determining a second position for the second three-dimensional space view according to the position change information of the first three-dimensional space view, and
    wherein changing the second three-dimensional space view presented on the second user interface comprises changing, according to the second position, the second three-dimensional space view presented on the second user interface.

18. A non-transitory computer readable storage medium storing program instructions that, when executed by a computer processor, cause the processor to implement operations for displaying three-dimensional space views, the three-dimensional space views at least comprising a first three-dimensional space view and a second three-dimensional space view, the operations comprising:
    presenting the first three-dimensional space view on a first user interface;
    presenting the second three-dimensional space view on a second user interface;
    receiving a user input at the first user interface to generate a view change instruction comprising field-of-view change information according to the user input;
    changing, according to the view change instruction, the first three-dimensional space view presented on the first user interface;
    sending the view change instruction comprising the field-of-view change information from the first user interface to the second user interface; and
    changing, according to the view change instruction comprising the field-of-view change information that is received from the first user interface, the second three-dimensional space view presented on the second user interface,
    wherein the method is used for displaying three-dimensional models of an apartment before and after decoration on a same screen, and
    wherein the first three-dimensional space view corresponds to a first three-dimensional model of the apartment, and the second three-dimensional space view corresponds to a second three-dimensional model of the apartment,
    the operations further comprising:
    loading, by the first user interface according to the view change instruction, data used for updating the first three-dimensional space view;
    loading, by the second user interface according to the view change instruction, data used for updating the second three-dimensional space view; and
    performing a synchronization on the first user interface and the second user interface to update the first three-dimensional space view and the second three-dimensional space view at the same time,
    wherein the synchronization includes: the first user interface notifying the second user interface that the first user interface has completed data loading, and the second user interface notifying the first user interface that the second user interface has completed data loading.

19. A computing apparatus, comprising a memory and a processor, wherein the memory stores program instructions that, when executed by the processor, cause the processor to implement operations for displaying three-dimensional space views, the three-dimensional space views at least comprising a first three-dimensional space view and a second three-dimensional space view, the operations comprising:
    presenting the first three-dimensional space view on a first user interface;
    presenting the second three-dimensional space view on a second user interface;
    receiving a user input at the first user interface to generate a view change instruction comprising field-of-view change information according to the user input;
    changing, according to the view change instruction, the first three-dimensional space view presented on the first user interface;
    sending the view change instruction comprising the field-of-view change information from the first user interface to the second user interface; and
    changing, according to the view change instruction comprising the field-of-view change information that is received from the first user interface, the second three-dimensional space view presented on the second user interface,
    wherein the method is used for displaying three-dimensional models of an apartment before and after decoration on a same screen, and
    wherein the first three-dimensional space view corresponds to a first three-dimensional model of the apartment, and the second three-dimensional space view corresponds to a second three-dimensional model of the apartment,
    the operations further comprising:
    loading, by the first user interface according to the view change instruction, data used for updating the first three-dimensional space view;
    loading, by the second user interface according to the view change instruction, data used for updating the second three-dimensional space view; and performing a synchronization on the first user interface and the second user interface to update the first three-dimensional space view and the second three-dimensional space view at the same time, wherein the synchronization includes: the first user interface notifying the second user interface that the first user interface has completed data loading, and the second user interface notifying the first user interface that the second user interface has completed data loading.

* * * * *